United States Patent
Ido et al.

(10) Patent No.: US 7,421,189 B2
(45) Date of Patent: Sep. 2, 2008

(54) DATA RECORDING DEVICE, DATA RECORDING METHOD, DATA EDITING DEVICE, AND DATA EDITING METHOD

(75) Inventors: Kazuo Ido, Kanagawa (JP); Ichiro Aki, Kanagawa (JP); Kohei Nakajo, Kanagawa (JP); Ichiro Ogata, Kanagawa (JP); Hiroshi Matsuzawa, Kanagawa (JP); Takaaki Murata, Tokyo (JP); Takayuki Ohishi, Kanagawa (JP); Kenji Ohtsuka, Kanagawa (JP); Mikio Kita, Kanagawa (JP)

(73) Assignee: Sony Corporation, Tokyo (JP)

(*) Notice: Subject to any disclaimer, the term of this patent is extended or adjusted under 35 U.S.C. 154(b) by 776 days.

(21) Appl. No.: 10/901,685

(22) Filed: Jul. 29, 2004

(65) Prior Publication Data

US 2004/0264923 A1 Dec. 30, 2004

Related U.S. Application Data

(62) Division of application No. 09/331,807, filed on Aug. 10, 1999, now Pat. No. 6,782,188.

(51) Int. Cl.
*H04N 5/91* (2006.01)
(52) U.S. Cl. ............................ 386/52; 386/111
(58) Field of Classification Search ................ 386/46, 386/52, 111, 112, 125, 126
See application file for complete search history.

(56) References Cited

U.S. PATENT DOCUMENTS

| | | | |
|---|---|---|---|
| 5,521,898 A | 5/1996 | Ogasawara | 386/112 |
| 5,706,386 A | 1/1998 | Miyazawa | 386/52 |
| 5,740,305 A | 4/1998 | Murakami | 386/52 |
| 5,802,240 A | 9/1998 | Asai | 386/52 |
| 6,393,197 B2 | 5/2002 | Henmi et al. | 386/52 |

FOREIGN PATENT DOCUMENTS

| | | |
|---|---|---|
| EP | 0 566 365 | 10/1993 |
| EP | 0 614 186 | 9/1994 |
| EP | 0 801 497 | 10/1997 |
| JP | 3 157077 | 7/1991 |
| JP | 3 295088 | 12/1991 |
| JP | 5 167983 | 7/1993 |
| JP | 5-176296 | 7/1993 |
| JP | 406139538 A | 5/1994 |
| JP | 6-309884 | 11/1994 |
| JP | 7-203367 | 8/1995 |
| JP | 8-46915 | 2/1996 |

(Continued)

*Primary Examiner*—Huy T Nguyen
(74) *Attorney, Agent, or Firm*—Frommer Lawrence & Haug LLP; William S. Frommer; Thomas F. Presson

(57) ABSTRACT

An original coded stream reproduced from a magnetic tape is decoded by an MPEG decoder, and original video data of a base band is thus generated. A switching circuit generates edited video data by switching the original video data and supplied insertion video data on the base band level at IN-point and OUT-point. The MPEG encoder generates an edited coded stream by coding the edited video data supplied from the switching circuit. A system controller controls a recording circuit to record a picture changed by editing processing, from among the edited coded stream, onto the magnetic tape.

11 Claims, 12 Drawing Sheets

FOREIGN PATENT DOCUMENTS

| | | | | | |
|---|---|---|---|---|---|
| JP | 8 335388 | 12/1996 | JP | 9 180410 | 7/1997 |
| JP | 09 18830 | 1/1997 | JP | 9-298711 | 11/1997 |
| | | | JP | 10-13783 | 1/1998 |
| | | | WO | WO 97 29488 | 8/1997 |

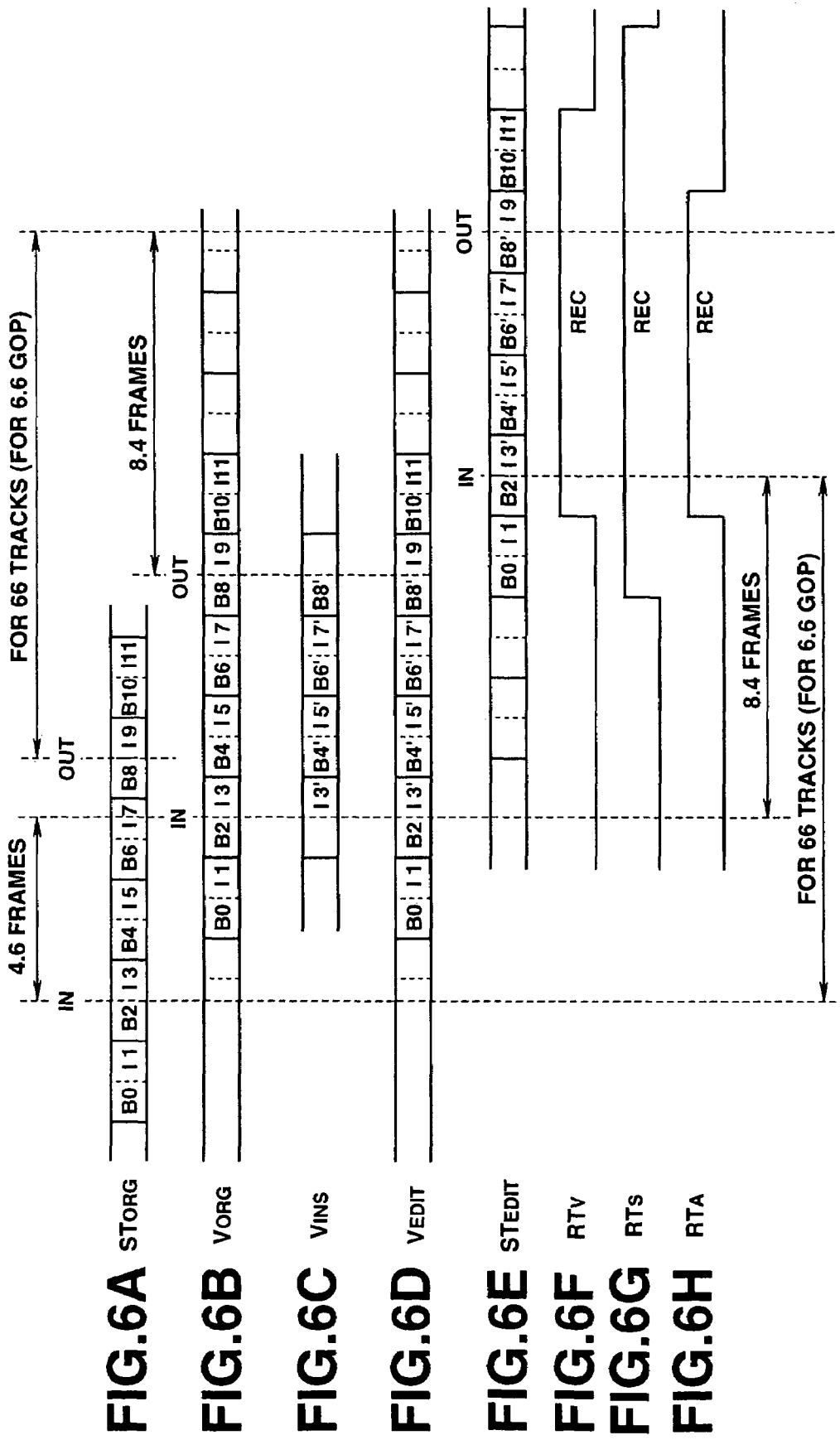

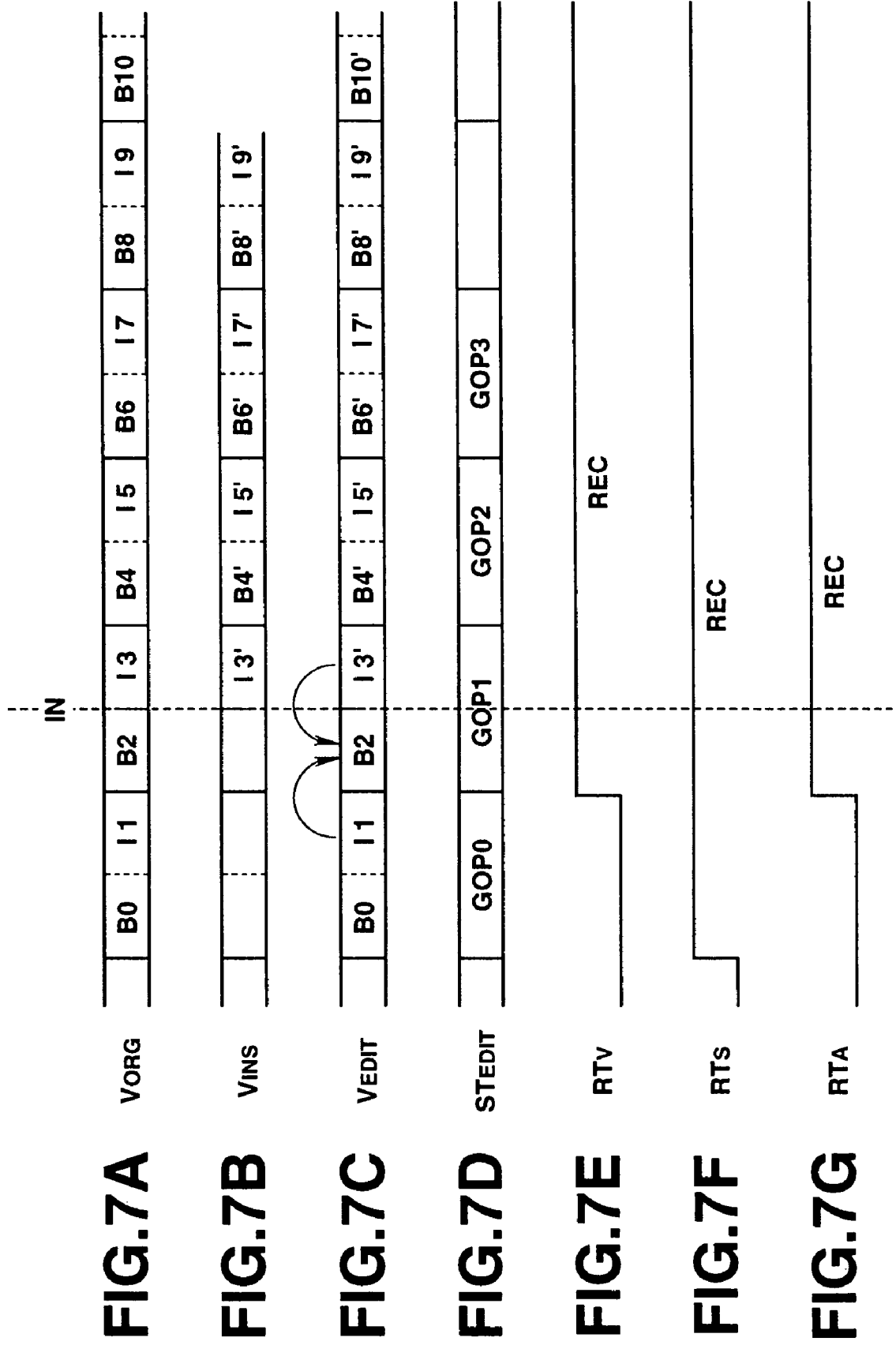

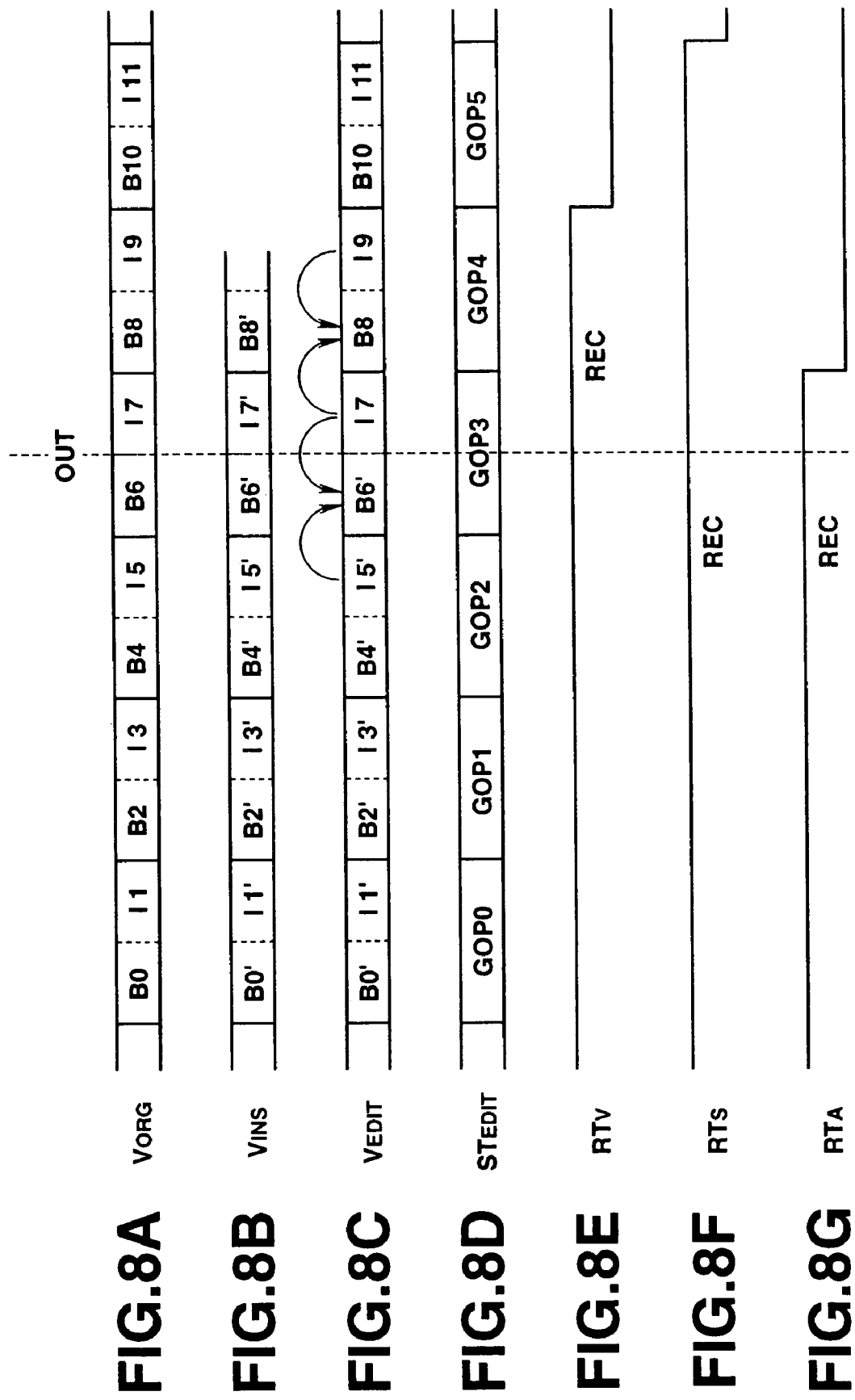

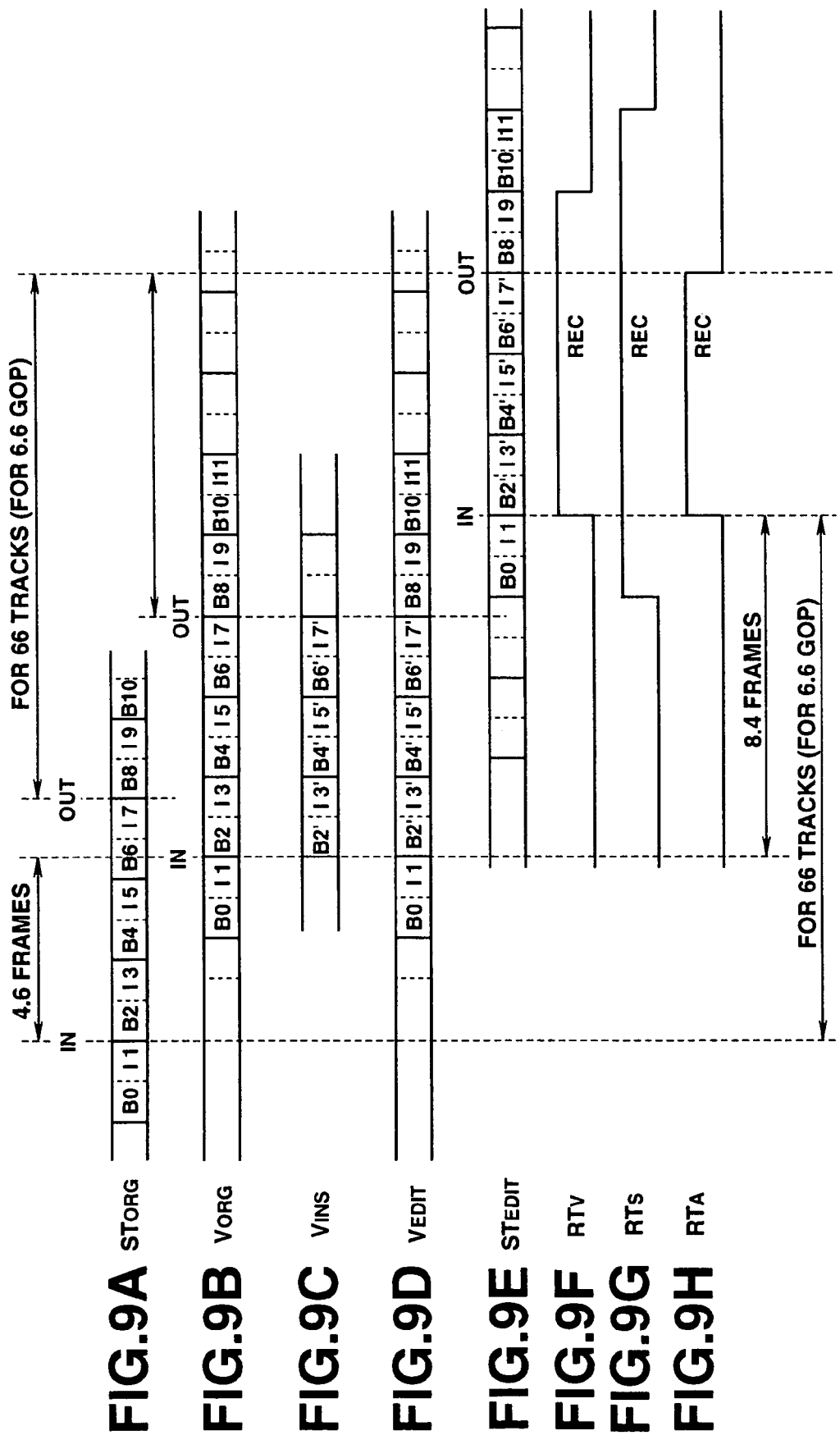

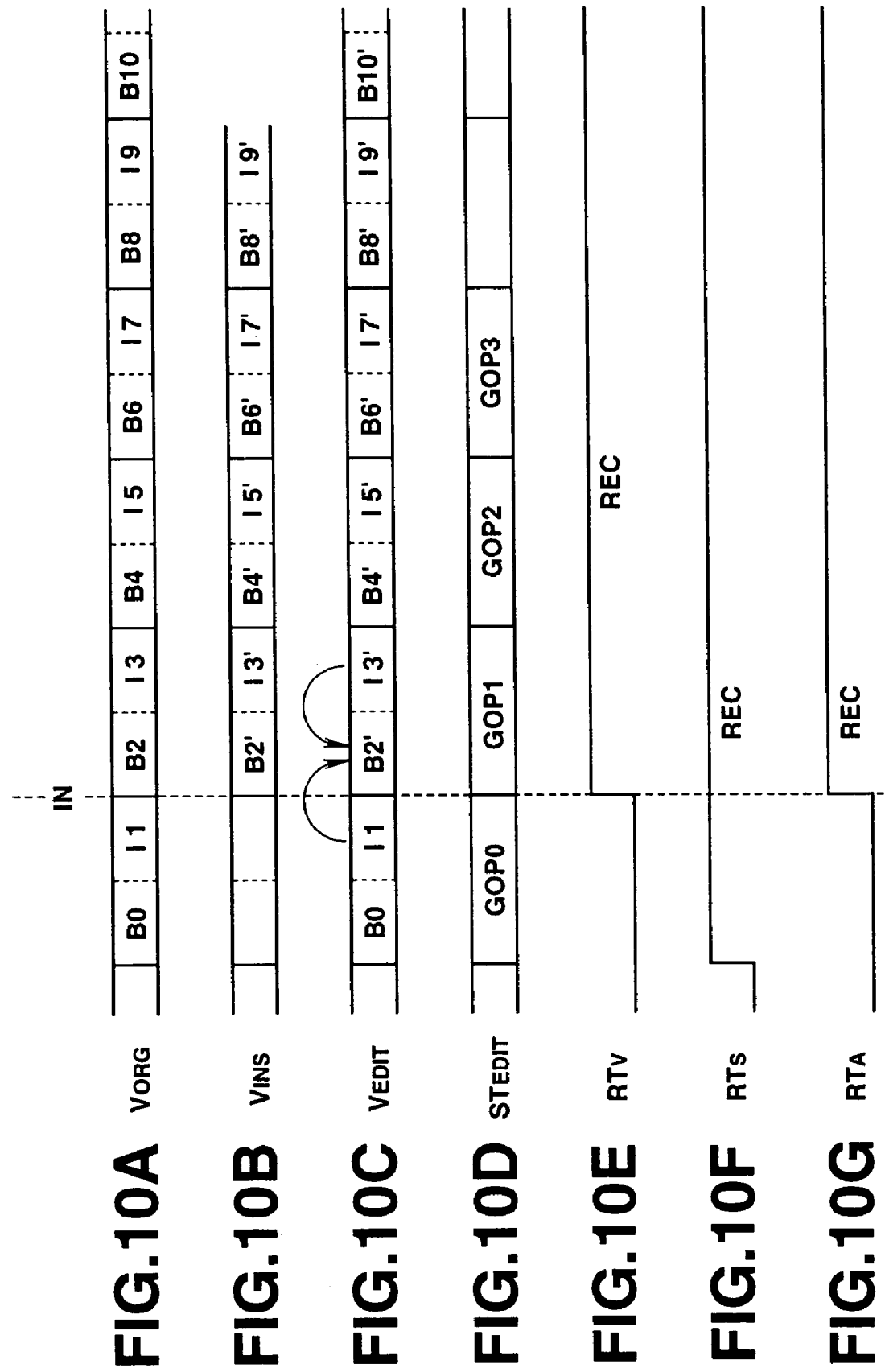

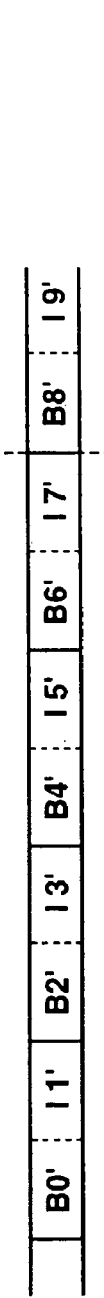
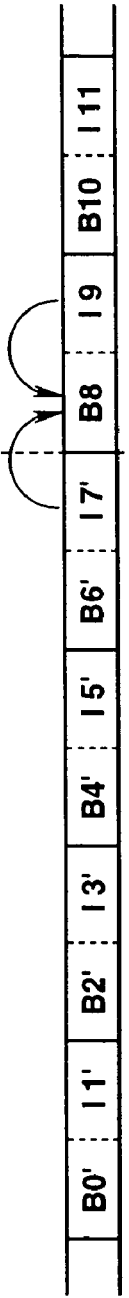

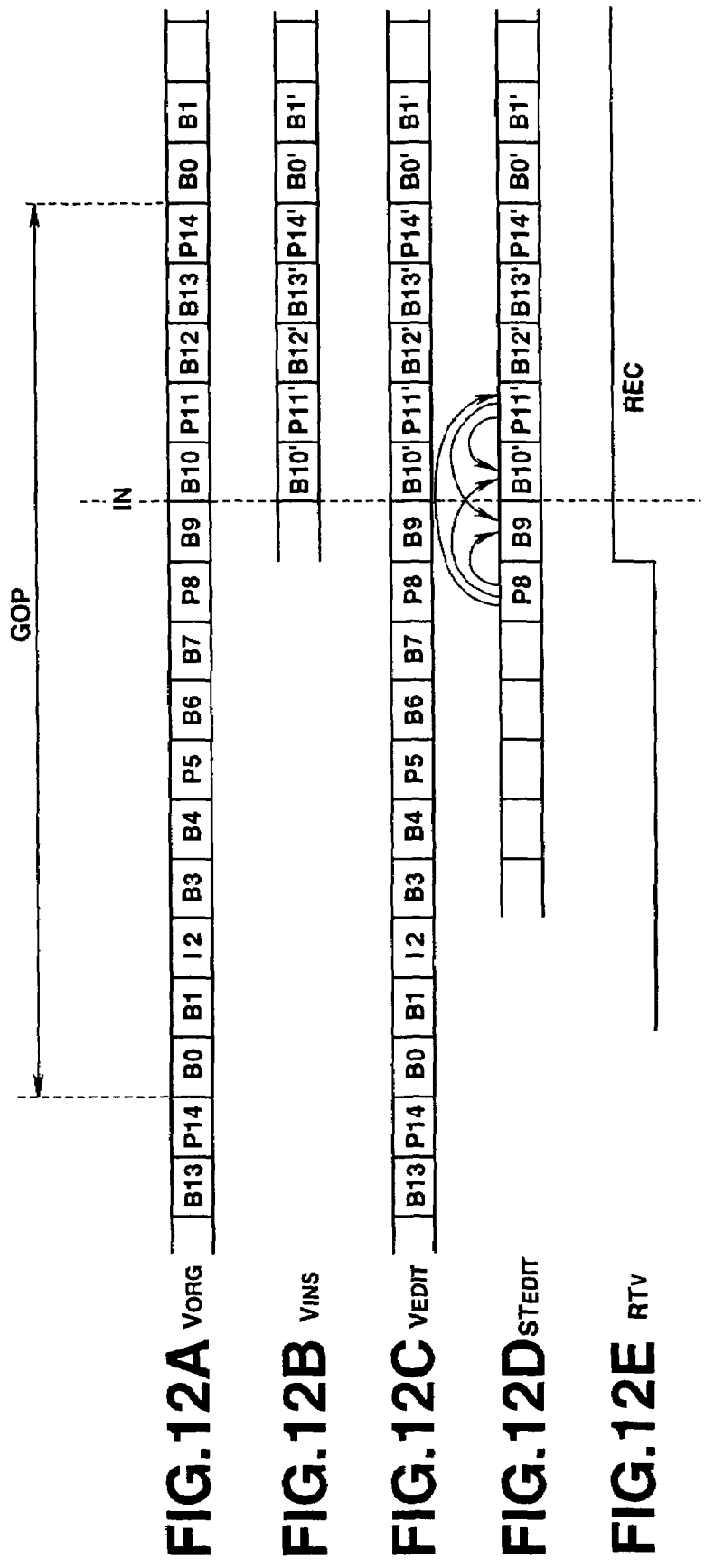

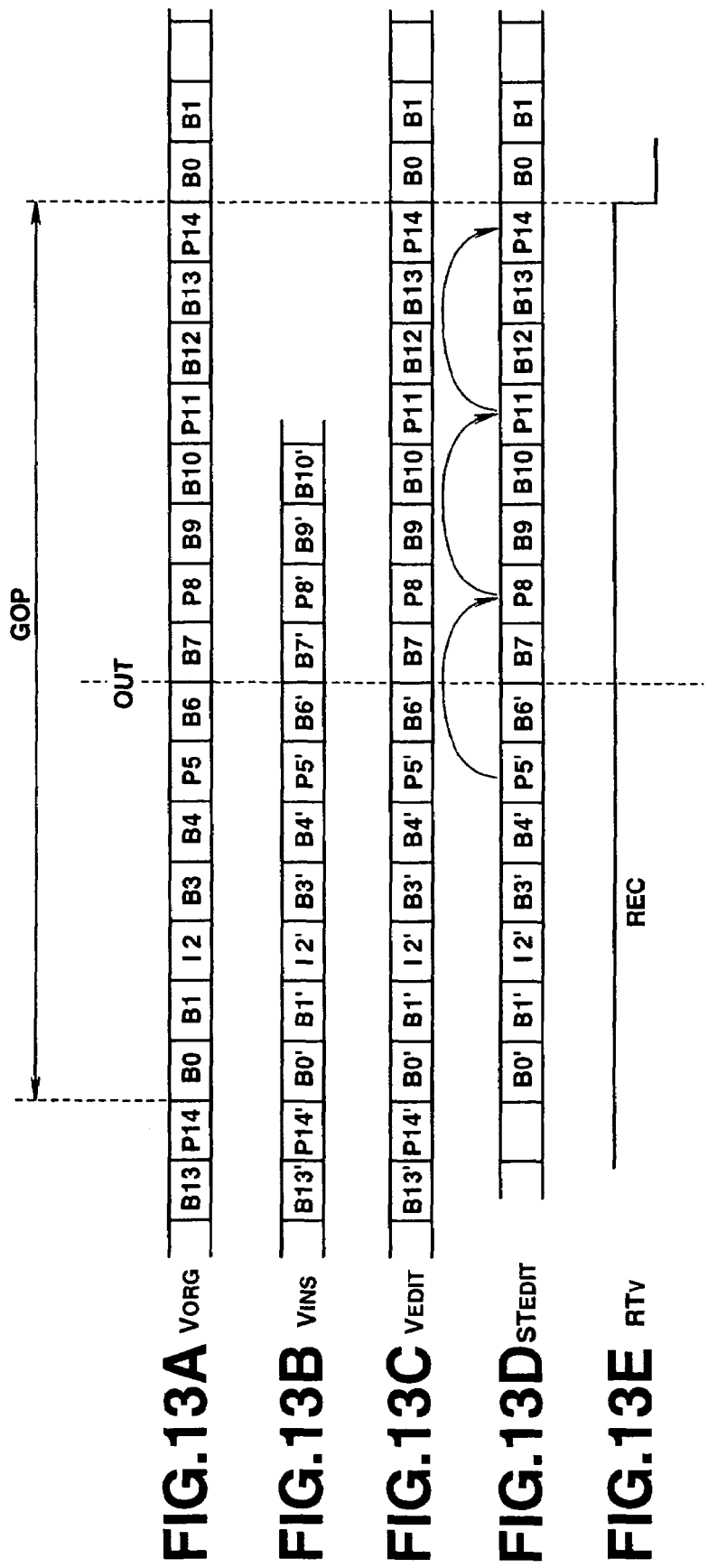

DATA RECORDING DEVICE, DATA RECORDING METHOD, DATA EDITING DEVICE, AND DATA EDITING METHOD

CROSS-REFERENCE TO RELATED APPLICATION

This application is a divisional application of U.S. patent application Ser. No. 09/331,807, filed Aug. 10, 1999 now U.S. Pat. No. 6,782,188.

TECHNICAL FIELD

This invention relates to a data recording device and a data recording method for editing, for each frame, a bidirectionally predictive coded stream based on the MPEG2 (Moving Picture Experts Group Phase 2) standard, and a data editing device and a data editing method which enable insertion editing for each frame.

BACKGROUND ART

Recently, there is proposed a digital video tape recorder for compression-coding video data by using a compression coding technique such as MPEG2 and recording the compression-coded stream onto a magnetic tape.

In accordance with the MPEG2 standard, a bidirectionally predictive coding system is employed as the coding system. In this bidirectionally predictive coding system, three types of coding, that is, intra-frame coding, inter-frame forward predictive coding, and bidirectionally predictive coding, are carried out. Pictures of the respective types are referred to as I-picture (intra coded picture), P-picture (predictive coded picture), and B-picture (bidirectionally predictive coded picture).

In general, I-picture, obtained by intra-frame coding, is not a picture predictively coded from another picture but a picture singly coded within this picture. P-picture, obtained by inter-frame forward predictive coding, is a picture predictively coded from past I-picture or P-picture. B-picture, obtained by bidirectionally predictive coding, is a picture bidirectionally predicted from past I-picture or P-picture and future I-picture or P-picture.

Also, in accordance with the MPEG standard, it is prescribed that an I-picture should be periodically inserted to enable random access. The unit thereof is referred to as GOP (Group Of Pictures).

At broadcasting stations, editing processing for editing a plurality of original video materials recorded on magnetic tapes so as to produce a television program to be on the air is carried out. In the case where such editing processing is carried out, edit points such as IN-point and OUT-point are set on the frame basis, and the plurality of video materials are cut and connected on the basis of the set edit points.

However, P-picture and B-picture included in a coded stream in conformity to the MPEG standard are pictures predictively coded from a past picture or a future picture, and are closely interrelated with the past or future picture. Therefore, a problem arises such that the coded stream cannot be cut or connected at an arbitrary frame position on the stream.

For example, if two different coded streams are forcedly connected with each other at an edit point, the picture quality of a decoded image is considerably deteriorated because a predictive picture of a picture near the editing point differs from a picture at the time of coding. Also, in some cases, since the coding parameter becomes discontinuous at the edit point, decoding cannot be carried out.

In short, in the conventional digital video tape recorder for recording a coded stream which is compression-coded in accordance with the MPEG standard, it is difficult to edit a coded stream recorded on a magnetic tape on the frame basis (picture basis). In addition, in the conventional digital video tape recorder in accordance with the MPEG standard, it is difficult to edit a coded stream recorded on a magnetic tape without deteriorating the picture quality.

DISCLOSURE OF THE INVENTION

In view of the foregoing status of the art, it is an object of the present invention to provide a data recording device and a data recording method for editing, on the frame basis, a coded stream bidirectionally predictive coded in accordance with the MPEG standard, and a data editing device and a data editing method which enable insertion editing on the frame basis. It is another object of the present invention to provide an editing device and an editing method in which the picture quality of a coded stream processed by insertion editing is not deteriorated.

A data recording device according to the present invention includes: reproducing means for reproducing an original coded stream recorded on a recording medium; decoding means for decoding the original coded stream outputted from the reproducing means, thereby generating decoded video data of a base band; editing means for switching the decoded video data of the base band and insertion video data at a set edit point, thereby generating edited video data of the base band; coding means for coding the edited video data to generate an edited coded stream; recording means for recording the edited coded stream onto the recording medium; and control means for controlling the recording means to record a picture corresponding to the insertion video data and a picture near the edit point, from among the edited coded stream, at positions corresponding to pictures of the original coded stream recorded on the recording medium.

Also, a data recording device according to the present invention includes: reproducing means for reproducing an original coded stream recorded on a recording medium; decoding means for decoding the original coded stream outputted from the reproducing means, thereby generating decoded video data of a base band; editing means for switching the decoded video data of the base band and insertion video data at a set edit point, thereby generating edited video data; coding means for coding the edited video data to generate an edited coded stream; recording means for recording the edited coded stream onto the recording medium; and control means for controlling the recording means to record a picture of the edited coded stream onto the recording medium by overwriting in the case where the picture of the edited coded stream is affected by editing processing by the editing means and is different from a picture of the original coded stream recorded on the recording medium, and not to record the picture of the edited coded stream onto the recording medium in the case where the picture of the edited coded stream is not affected by editing processing by the editing means and is the same as the picture of the original coded stream recorded on the recording medium.

Also, a data recording device according to the present invention includes: reproducing means for reproducing an original coded stream recorded on a recording medium; decoding means for decoding the original coded stream outputted from the reproducing means, thereby generating decoded video data of a base band; editing means for switching the decoded video data and insertion video data on the base band level at an edit point, thereby generating edited video data; coding means for encoding the edited video data, the coding means encoding a picture near IN-point and a picture near OUT-point so that the coded stream becomes continuous at the IN-point and OUT-point; recording means for recording the edited coded stream onto the recording medium; and control means for controlling the recording means to record only a picture of the edited coded stream affected by editing processing by the editing means, onto the recording medium.

Also, a data recording device according to the present invention includes: reproducing means for reproducing an original coded stream recorded on a recording medium; decoding means for decoding the original coded stream outputted from the reproducing means, thereby generating decoded video data of a base band; editing means for switching the decoded video data of the base band and insertion video data at a set edit point, thereby generating edited video data; coding means for coding the edited video data to generate an edited coded stream; recording means for recording the edited coded stream onto the recording medium; and control means for controlling the recording means to record pictures from a picture immediately after IN-point onto the recording medium by overwriting in the case where a picture immediately before the IN-point is I-picture, and controlling the recording means to record pictures at least from B-picture as a picture immediately before the IN-point onto the recording medium by overwriting in the case where the picture immediately before the IN-point is B-picture.

A data recording method according to the present invention includes the steps of: reproducing an original coded stream recorded on a recording medium; decoding the reproduced original coded stream, thereby generating decoded video data of a base band; switching the decoded video data of the base band and insertion video data at a set edit point, thereby generating edited video data of the base band; coding the edited video data to generate an edited coded stream; and recording a picture corresponding to the insertion video data and a picture near the edit point, from among the edited coded stream, at positions corresponding to pictures of the original coded stream recorded on the recording medium.

Also, a data recording method according to the present invention includes the steps of: reproducing an original coded stream recorded on a recording medium; decoding the reproduced original coded stream, thereby generating decoded video data of a base band; switching the decoded video data of the base band and insertion video data at a set edit point, thereby generating edited video data; coding the edited video data to generate an edited coded stream; and recording a picture of the edited coded stream onto the recording medium by overwriting in the case where the picture of the edited coded stream is affected by editing processing and is different from a picture of the original coded stream recorded on the recording medium, while not recording the picture of the edited coded stream onto the recording medium in the case where the picture of the edited coded stream is not affected by editing processing and is the same as the picture of the original coded stream recorded on the recording medium.

Also, a data recording method according to the present invention includes: a step of reproducing an original coded stream recorded on a recording medium; a step of decoding the reproduced original coded stream, thereby generating decoded video data of a base band; a step of switching the decoded video data and insertion video data on the base band level at an edit point, thereby generating edited video data; a coding step of encoding the edited video data, for encoding a picture near IN-point and a picture near OUT-point so that the coded stream becomes continuous at the IN-point and OUT-point; a recording step of recording the edited coded stream onto the recording medium; and a control step of controlling the recording step to record only a picture of the edited coded stream affected by editing processing at the editing step, onto the recording medium.

Also, a data recording method according to the present invention includes: a reproducing step of reproducing an original coded stream recorded on a recording medium; a decoding step of decoding the original coded stream outputted from the reproducing step, thereby generating decoded video data of a base band; an editing step of switching the decoded video data of the base band and insertion video data at a set edit point, thereby generating edited video data; a coding step of coding the edited video data to generate an edited coded stream; a recording step of recording the edited coded stream onto the recording medium; and a control step of controlling the recording step to record pictures from a picture immediately after IN-point onto the recording medium by overwriting in the case where a picture immediately before the IN-point is I-picture, and controlling the recording step to record pictures at least from B-picture as a picture immediately before the IN-point onto the recording medium by overwriting in the case where the picture immediately before the IN-point is B-picture.

A data editing device according to the present invention includes: reproducing means for reproducing an original coded stream recorded on a recording medium; decoding means for decoding the original coded stream outputted from the reproducing means, thereby generating decoded video data of a base band; editing means for switching the decoded video data of the base band and insertion video data at a set edit point, thereby generating edited video data of the base band; coding means for coding the edited video data to generate an edited coded stream; recording means for recording the edited coded stream onto the recording medium; and control means for realizing insertion editing on the frame basis by controlling the recording means to record a picture corresponding to the insertion video data and a picture near the edit point, from among the edited coded stream, at positions corresponding to pictures of the original coded stream recorded on the recording medium.

Also, a data editing device according to the present invention includes: reproducing means for reproducing an original coded stream recorded on a recording medium; decoding means for decoding the original coded stream outputted from the reproducing means, thereby generating decoded video data of a base band; editing means for switching the decoded video data of the base band and insertion video data at a set edit point, thereby generating edited video data; coding means for coding the edited video data to generate an edited coded stream; recording means for recording the edited coded stream onto the recording medium; and control means for controlling the recording means to record a picture of the edited coded stream onto the recording medium by overwriting in the case where the picture of the edited coded stream is affected by editing processing by the editing means and is different from a picture of the original coded stream recorded on the recording medium, and not to record the picture of the edited coded stream onto the recording medium in the case where the picture of the edited coded stream is not affected by editing processing by the editing means and is the same as the picture of the original coded stream recorded on the recording medium.

Also, a data editing device according to the present invention includes: reproducing means for reproducing an original coded stream recorded on a recording medium; decoding means for decoding the original coded stream outputted from the reproducing means, thereby generating decoded video data of a base band; editing means for switching the decoded video data and insertion video data on the base band level at an edit point, thereby generating edited video data; coding means for encoding the edited video data, the coding means encoding a picture near IN-point and a picture near OUT-point so that the coded stream becomes continuous at the IN-point and OUT-point; recording means for recording the edited coded stream onto the recording medium; and control means for enabling insertion editing on the frame basis by controlling the recording means to record only a picture of the edited coded stream affected by editing processing by the editing means, onto the recording medium.

Also, a data editing device according to the present invention includes: reproducing means for reproducing an original coded stream recorded on a recording medium; decoding means for decoding the original coded stream outputted from the reproducing means, thereby generating decoded video data of a base band; editing means for switching the decoded video data of the base band and insertion video data at a set edit point, thereby generating edited video data; coding means for coding the edited video data to generate an edited coded stream; recording means for recording the edited coded stream onto the recording medium; and control means for controlling the recording means to record pictures from a picture immediately after IN-point onto the recording medium by overwriting in the case where a picture immediately before the IN-point is I-picture, and controlling the recording means to record pictures at least from B-picture as a picture immediately before the IN-point onto the recording medium by overwriting in the case where the picture immediately before the IN-point is B-picture.

A data editing method according to the present invention includes the steps of: reproducing an original coded stream recorded on a recording medium; decoding the reproduced original coded stream, thereby generating decoded video data of a base band; switching the decoded video data of the base band and insertion video data at a set edit point, thereby generating edited video data of the base band; coding the edited video data to generate an edited coded stream; and enabling insertion editing on the frame basis by recording a picture corresponding to the insertion video data and a picture near the edit point, from among the edited coded stream, at positions corresponding to pictures of the original coded stream recorded on the recording medium.

Also, a data editing method according to the present invention includes the steps of: reproducing an original coded stream recorded on a recording medium; decoding the reproduced original coded stream, thereby generating decoded video data of a base band; switching the decoded video data of the base band and insertion video data at a set edit point, thereby generating edited video data; coding the edited video data to generate an edited coded stream; and recording a picture of the edited coded stream onto the recording medium by overwriting in the case where the picture of the edited coded stream is affected by editing processing and is different from a picture of the original coded stream recorded on the recording medium, while not recording the picture of the edited coded stream onto the recording medium in the case where the picture of the edited coded stream is not affected by editing processing and is the same as the picture of the original coded stream recorded on the recording medium.

Also, a data editing method according to the present invention includes: a step of reproducing an original coded stream recorded on a recording medium; a step of decoding the reproduced original coded stream, thereby generating decoded video data of a base band; a step of switching the decoded video data and insertion video data on the base band level at an edit point, thereby generating edited video data; a coding step of encoding the edited video data, for encoding a picture near IN-point and a picture near OUT-point so that the coded stream becomes continuous at the IN-point and OUT-point; a recording step of recording the edited coded stream onto the recording medium; and a control step of controlling the recording step to record only a picture of the edited coded stream affected by editing processing, onto the recording medium, thereby enabling insertion editing on the frame basis.

Also, a data editing method according to the present invention includes: a reproducing step of reproducing an original coded stream recorded on a recording medium; a decoding step of decoding the original coded stream outputted from the reproducing step, thereby generating decoded video data of a base band; an editing step of switching the decoded video data of the base band and insertion video data at a set edit point, thereby generating edited video data; a coding step of coding the edited video data to generate an edited coded stream; a recording step of recording the edited coded stream onto the recording medium; and a control step of controlling the recording step to record pictures from a picture immediately after IN-point onto the recording medium by overwriting in the case where a picture immediately before the IN-point is I-picture, and controlling the recording step to record pictures at least from B-picture as a picture immediately before the IN-point onto the recording medium by overwriting in the case where the picture immediately before the IN-point is B-picture, thereby enabling insertion editing on the frame basis.

BRIEF DESCRIPTION OF THE DRAWINGS

FIGS. 6A to 6H are time charts for explaining delay of video data or a coded stream due to insertion editing.

FIGS. 7A to 7G illustrate processing at IN-point of insertion editing.

FIGS. 8A to 8G illustrate processing at OUT-point of insertion editing.

FIGS. 9A to 9H are time charts for explaining delay of video data or a coded stream due to another insertion editing.

FIGS. 10A to 10G illustrate processing at IN-point of another insertion editing.

FIGS. 11A to 11G illustrate processing at OUT-point of another insertion editing.

FIGS. 12A to 12E illustrate editing processing at IN-point of a typical coded stream.

FIGS. 13A to 13E illustrate editing processing at OUT-point of a typical coded stream.

BEST MODE FOR CARRYING OUT THE INVENTION

Preferred embodiments of the present invention will now be described in detail with reference to the drawings.

Figure 1:
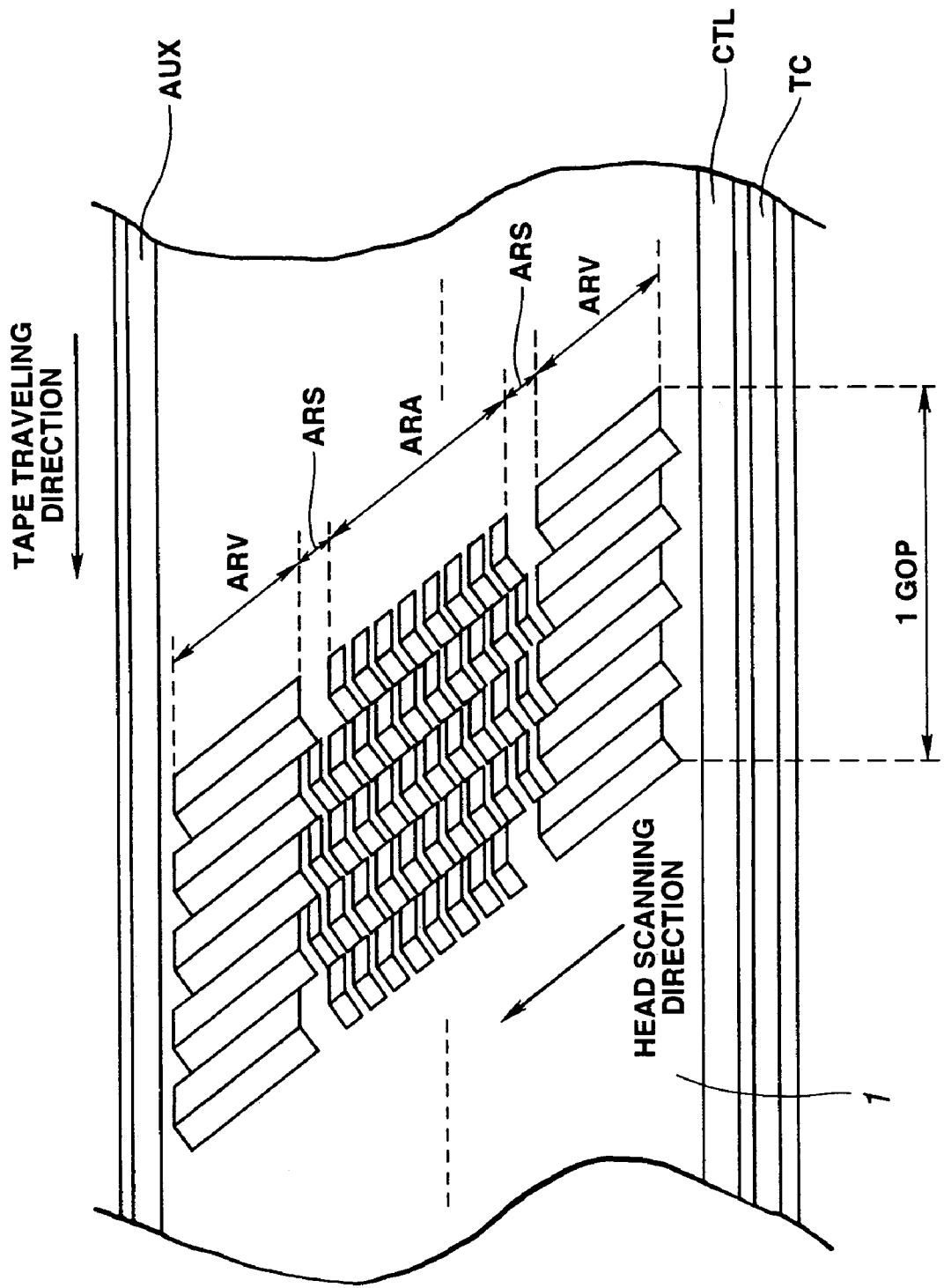
FIG. 1 shows the recording format on a magnetic tape.

FIG. 1 is a plan view showing the recording format of a magnetic tape 1 employed in a video tape recorder according to an embodiment of the present invention.

On the magnetic tape 1 of FIG. 1 employed in the video tape recorder, recording tracks AUX, CTL and TC for recording various signals are formed on upper and lower ends and in the longitudinal direction of the magnetic tape 1. Between these recording tracks AUX and CTL, oblique tracks are formed by sequential azimuth recording.

On the recording track AUX on the upper end of the longitudinal recording tracks, auxiliary data such as analog audio signals and a cue signal are recorded. On the recording track TC of the lower-end recording tracks, a time code is recorded. The recording track CTL is allocated as a track for recording a timing signal for controlling a recording/reproduction system, and a control signal CTL having the one-cycle signal level switched by five tracks of the oblique tracks is recorded.

The oblique tracks are formed in such a manner that each 10 recording tracks (in the case of the NTSC signals) having a gap of two tracks between them are used as a unit. On these 10 recording tracks, a coded stream in accordance with the MPEG standard, audio data and system data are recorded in predetermined arrangement.

Of the oblique tracks, areas on the scanning start side and the scanning end side of the magnetic head are allocated as video areas ARV, in which a coded stream is recorded together with an error correction code in predetermined arrangement. On the inner side of these video areas ARV, system data areas ARS are provided, each having a predetermined gap from the video area. These system data areas ARS are provided on the eight recording tracks except for the leading track and the last track of the 10 recording tracks. In these system data areas ARS, predetermined system data and an error correction code are recorded.

As the system data, there are provided identification data indicating the order of the corresponding GOP and GOP preceding and subsequent to the corresponding GOP, hysteresis data on which increment is made by insertion editing and assemble editing, and edit point data indicating edit points such as IN-point and OUT-point.

The identification data indicating the order of GOP includes sequential numbers appended to the individual GOP. In the present embodiment, numbers "0" to "7" are repeatedly appended to the respective GOP.

On the eight tracks having the system data areas ARS in each GOP, the same identification data is recorded. For example, if the identification data of the corresponding GOP is "3", the identification data of the preceding GOP is "2" and the identification data of the subsequent GOP is "4". Therefore, the identification data indicating "2", "3" and "4" are recorded in the system data areas ARS in the corresponding GOP.

The reason for describing not only the identification data of the corresponding GOP but also the identification data of the preceding and subsequent GOP is that high-speed reproduction processing is to be realized by reading in advance the identification data of the preceding and subsequent GOP recorded as the system data, at the time of fast feet reproduction or rewind reproduction.

The hysteresis data is data on which increment is made by editing processing such as insertion editing and assemble editing, and is provided for each track. If data recorded on the tape is original data, the hysteresis data of all the tracks are "0". The hysteresis data of a track which is newly overwritten by editing processing such as insertion editing is "1". Every time such editing processing is repeated, increment is made on this hysteresis data.

On the inner side of the system data areas ARS, an audio data area ARA having a predetermined gap from the system data areas is provided. This audio data area ARA is divided into eight sectors with a predetermined gap provided between them, and audio data of four channels are allocated and recorded in these sectors.

Figure 2:
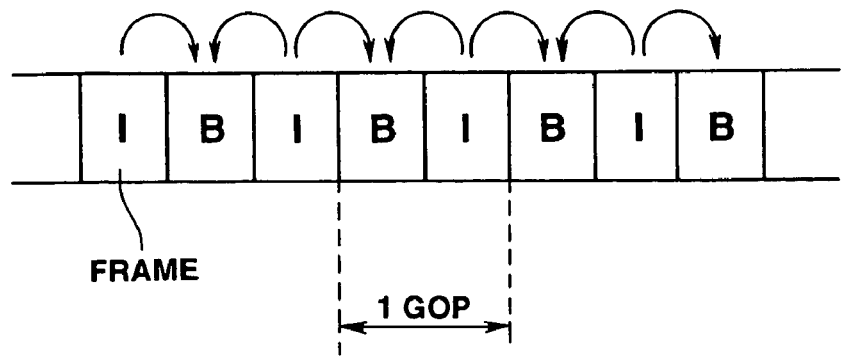
FIG. 2 illustrates the picture type of a coded stream.

FIG. 2 illustrates compression coding processing of video data which is thus recorded on the magnetic tape 1. In this embodiment, coding processing is carried out on each picture so that continuous two frames (two pictures) constitute one GOP. The picture type of the leading frame of each GOP is B-picture obtained by inter-frame coding processing in which past and future frames are set as predictive frames. The picture type of the subsequent frame is I-picture obtained by intra-frame coding processing.

In FIG. 2, the direction of prediction of B-picture is indicated by arrows. Each B-picture is predictive-coded from both the past I-picture and the future I-picture.

Figure 3:
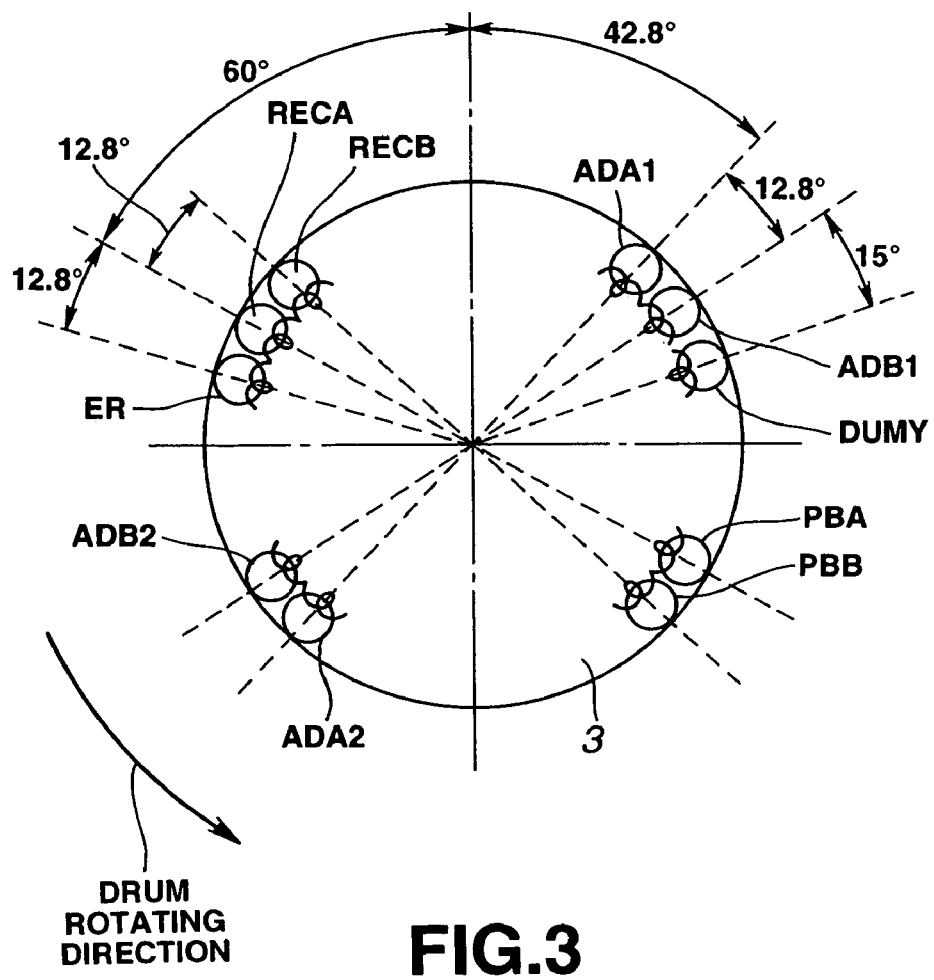
FIG. 3 is a plan view showing arrangement of a magnetic head.

FIG. 3 is a plan view showing arrangement of a magnetic head of the video tape recorder corresponding to the above-described recording format. In the video tape recorder of this embodiment, a recording head RECA and a recording head RECB are provided at a predetermined spacing (12.8 degrees) from each other on a rotary drum 3, and monitor heads PBA and PBB are provided at positions of 180 degrees from the recording heads RECA and RECB, respectively.

Figure 4:
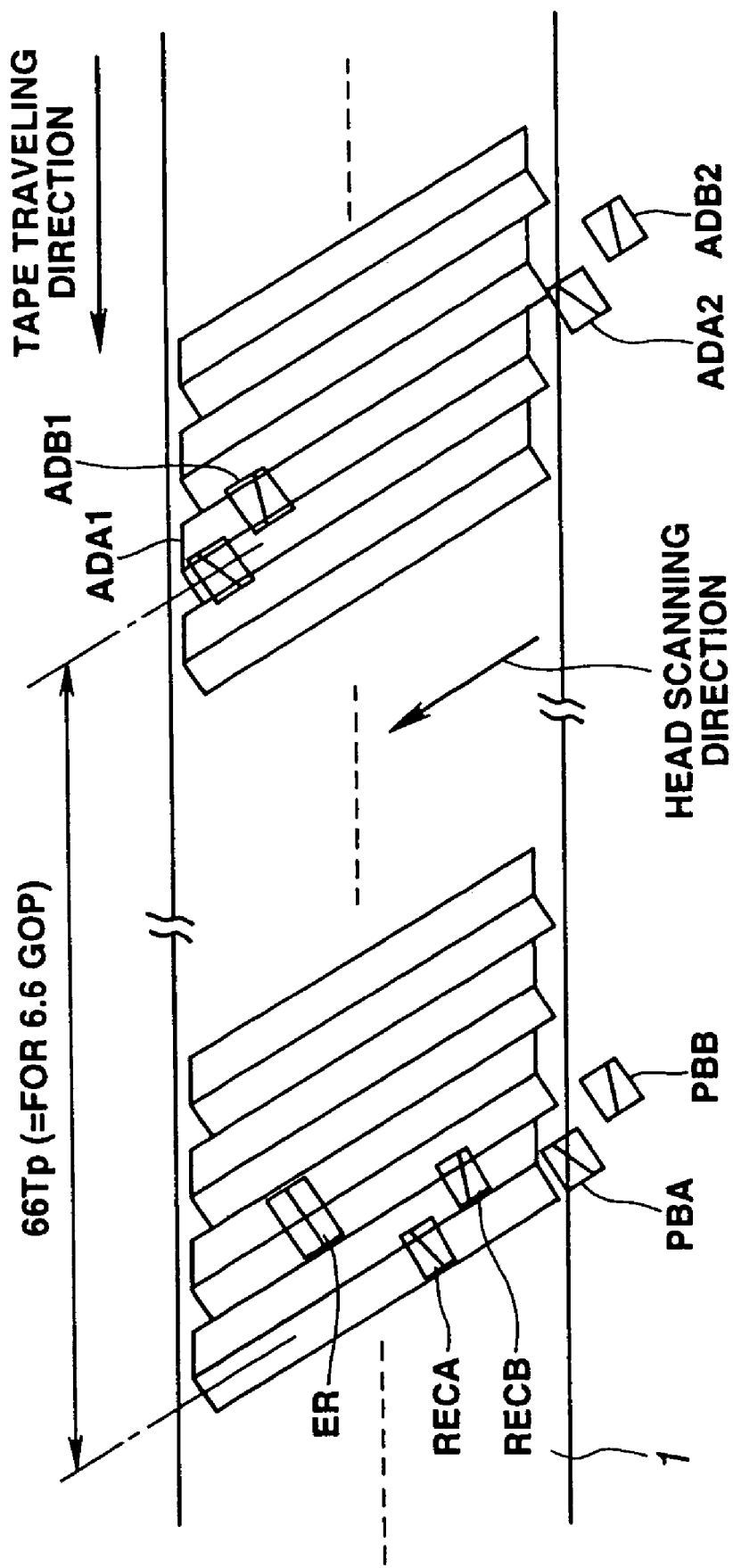
FIG. 4 shows scanning by the magnetic head on a magnetic tape.

As shown in FIG. 4, the recording heads RECA and RECB are provided at such positions that when the magnetic head scans the magnetic tape, the recording heads RECA and RECB are shifted by a half-track pitch to the forward side from the monitor heads PBA and PBB, on the magnetic tape. In short, the monitor heads PBA and PBB are caused to scan the scanning locus of the corresponding recording heads RECA and RECB immediately after the scanning by the recording heads RECA and RECB. Thus, in the video tape recorder, recording results can be monitored while recording processing is carried out. On the rotary drum 3, the magnetic tape 1 is wound substantially at a winding angle of 180 degrees.

In addition, an erase head ER is provided at a position spaced away from the recording head RECA by 12.8 degrees on the rotary drum 3, as shown in FIG. 3. The erase head ER is provided at a position preceding the recording heads RECA and RECB so as to collectively scan the two recording tracks to be scanned by the recording heads RECA and RECB immediately before the scanning by the recording heads RECA and RECB, as shown in FIG. 4. By providing the erase head at such a position preceding the recording heads, over-write recording can be carried out.

Also, on the rotary drum 3, advanced reading heads ADA1 and ADB1 are provided at positions spaced away from the recording heads RECA and RECB by 102.8 degrees in the reverse rotating direction of the rotary drum 3. Moreover, advanced reading heads ADA2 and ADB2 are provided at positions of 180 degrees from the advanced reading heads ADA1 and ADB1, respectively.

These advanced reading heads ADA1, ADB1 and advanced reading heads ADA2, ADB2 are provided on the rotary drum 3 so that the magnetic heads of the corresponding azimuth angle have the same height. In the present embodiment, even when recording tracks corresponding to the one pair of advanced reading heads (ADA1, ADB1) are scanned by off-tracking of one track, the other pair of advanced reading heads (ADA2, ADB2) can scan the corresponding recording tracks by just tracking. Therefore, ultimate reproduced data can be provided by synthesizing the reproduced signals from both the advanced reading heads ADA1, ADB1 and the advanced reading heads ADA2, ADB2.

Moreover, these advanced reading heads ADA1, ADB1 and advanced reading heads ADA2, ADB2 are positioned on the rotary drum so that the advanced reading heads ADA1, ADB1 on the following side are advanced by a 66-track pitch (66Tp) from the recording heads RECA, RECB to scan the magnetic tape 1.

In the video tape recorder of the present embodiment, the total time of the delay time in reproduction processing required for decoding reproduced video data obtained by the advanced reading heads ADA1, ADB1 on the preceding side and the delay time in recording processing required for compression-coding the video data and recording the coded video data onto the magnetic tape 1 is the time for 6.6 GOP. In the following description, the time for 6.6 GOP found by totaling the reproduction processing time and the recording processing time is referred to as a system delay.

As shown in FIG. 4, the track pitch 66Tp consisting of 66 tracks for recording data of 6.6 GOP is equivalent to this system delay. That is, the positions of the advanced reading heads ADA1, ADB1, ADA2, ADB2 with respect to the recording heads RECA, RECB are determined so as to correspond to the system delay.

Thus, in this video tape recorder, when the video data reproduced by the advanced reading heads ADA1, ADB1 or the advanced reading heads ADA2, ADB2 are delayed by the system delay consisting of the reproduction processing time and the recording processing time, the recording heads RECA, RECB are about to scan the track on which the reproduced video data have been originally recorded. Therefore, the video data reproduced by the advanced reading heads ADA1, ADB1 or the advanced reading heads ADA2, ADB2 can be recorded at perfectly the same position as the original position by the recording heads RECA, RECB. That is, insertion editing for inserting new video data at a desired edit point can be realized while the original video data are reproduced from the tape.

Figure 5:
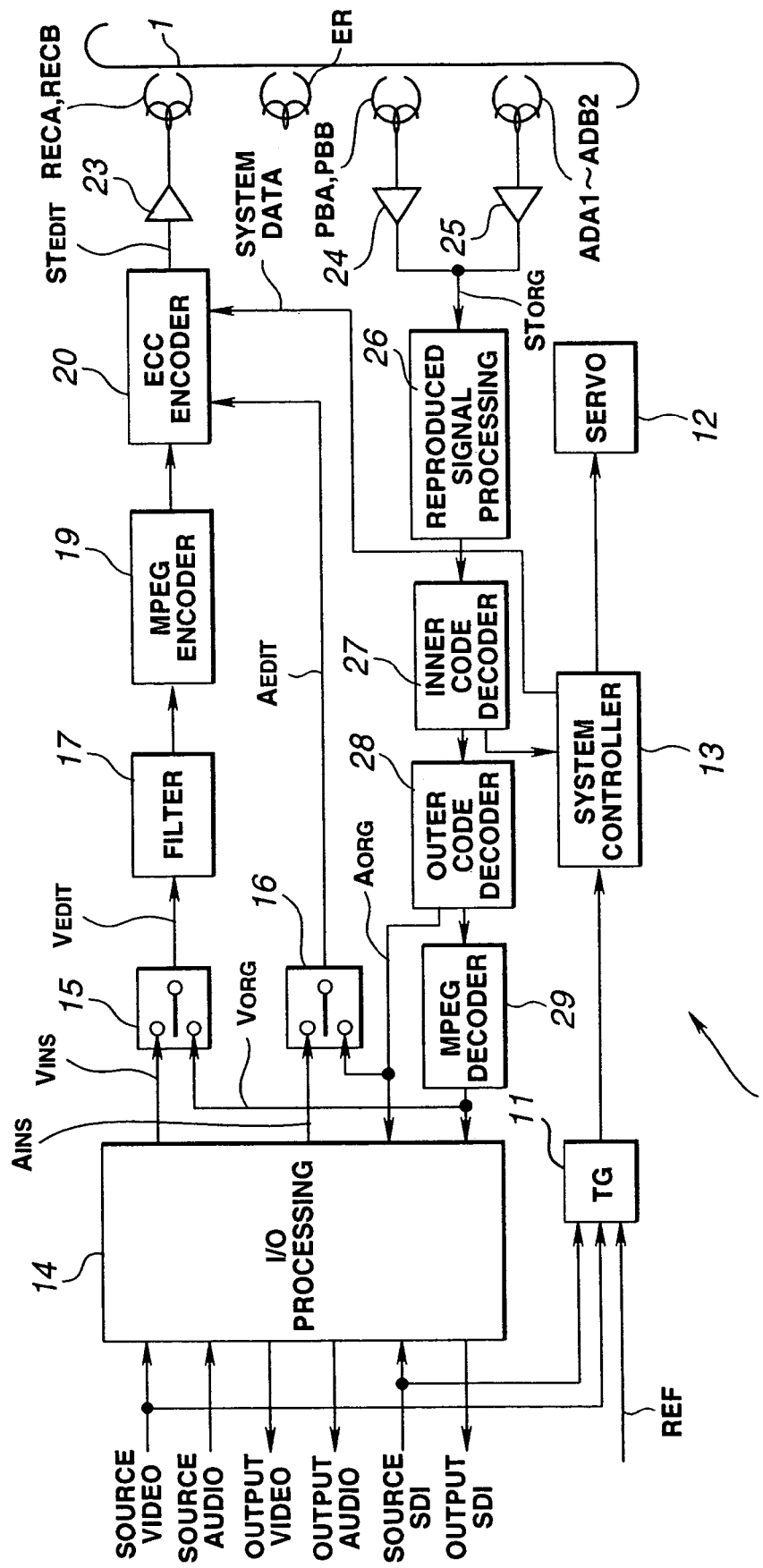
FIG. 5 is a block diagram showing the overall structure of a video tape recorder.

FIG. 5 is a block diagram showing the overall structure of a video tape recorder 10 of the embodiment of the present invention.

In this video tape recorder 10, a timing generator (TG) 11 receives an intra-station synchronizing signal REF, a source video signal, and a serial digital video signal (SDI). The timing generator 11 generates a reference signal indicating the timing of each frame synchronized with the intra-station synchronizing signal REF, source video signal or serial digital video signal, and supplies the reference signal to a system controller 13.

A servo circuit 12 is a circuit for driving magnetic tape traveling system circuits such as a reel driving circuit and a capstan driving circuit provided in the video tape recorder 10, and a drum control circuit for controlling the rotational speed of the rotary drum, under the control of the system controller 13. This servo circuit 12 forms 10 recording tracks during a period of two frames (one GOP) as described with reference to FIG. 1, by controlling the tape traveling system circuits and the drum control circuit.

An I/O processing circuit 14 is a circuit for carrying out input signal processing of video signals and audio signals supplied from outside, and output signal processing of video signals and audio signals to be outputted from the video tape recorder. For example, if the I/O processing circuit 14 receives analog composite source video signals from outside, it carries out analog-digital conversion processing of the video signals with reference to the reference signal generated by the timing generator at the timing synchronized with the source video signals, and then outputs the generated digital video signals as base band video data consisting of continuous luminance data and color-difference data at a predetermined sampling rate. Also, the I/O processing circuit 14 receives audio signals of four channels corresponding to the source video signals and carries out signal processing of the audio signals similar to that of the source video signals, thereby outputting audio data of four channels corresponding to the base band video data.

If the I/O processing circuit 14 receives digital video signals consisting of sequentially continuous video data and audio data of serial data of a predetermined format, it converts the digital video signals to video data consisting of continuous luminance data and color-difference data, and audio data, and outputs the resulting video data and audio data.

Also, the I/O processing circuit 14 carries out signal processing so that the video data and audio data reproduced from the magnetic tape 1 or edited video data and audio data outputted from switching circuits 16 and 15 become serial video signals of a predetermined format, and carries out signal processing so that the video data and audio data become analog composite video signals and audio signals of four channels.

The switching circuit 15 is a circuit for switching the base band video data outputted from the I/O processing circuit 14 and base band video data outputted from an MPEG decoder 29 at edit points such as IN-point and OUT-point under the control of the system controller 13. That is, this switching circuit 15 is a circuit for switching the base band video data. The switching circuit 15 outputs the video data generated by switching at the edit points, as edited video data to a filter circuit 17. The switching circuit 16 is a circuit for carrying out the same operation as the above-described switching circuit 15 under the control of the system controller 13. The switching circuit 16 switches the audio data outputted from the I/O processing circuit 14 and audio data outputted from an outer code decoder 28 at edit points such as IN-point and OUT-point, thereby outputting edited audio data.

For example, in recording source video data and source audio data supplied from outside onto the magnetic tape 1, the terminals of the switching circuits 15 and 16 are fixed to connection to the respective upper terminals so as to supply the video data and audio data outputted from the I/O processing circuit 14 to the filter circuit 17 and an ECC encoder 20, respectively, under the control of the system controller 13.

On the other hand, in carrying out insertion editing for inserting insertion video data supplied from outside into the video data already recorded on the magnetic tape 1, the switching operation of the switching circuits 15 and 16 is changed over at edit points such as IN-point and OUT-point. Specifically, during a period up to IN-point, the terminals of the switching circuits 15 and 16 are connected to the respective lower terminals so as to supply the video data outputted from the MPEG decoder 29 and the audio data outputted form the outer code decoder 28 to the filter circuit 17 and the ECC encoder 20, respectively. During a period from IN-point to OUT-point, the terminals of the switching circuits 15 and 16 are connected to the respective upper terminals so as to supply the insertion video data and insertion audio data outputted from the I/O processing circuit 14 to the filter circuit 17 and the ECC encoder 20, respectively. During a period after OUT-point, the terminals of the switching circuits 15 and 16 are again connected to the respective lower terminals so as to supply the video data outputted from the MPEG decoder 29 and the audio data outputted from the outer code decoder 28 to the filter circuit 17 and the ECC encoder 20, respectively. Processing related to this insertion editing will be later described in detail.

The filter 17 is a band-limiting filter for receiving video data outputted from the switching circuit 15 and limiting noise of the video data. By reducing noise in a high-frequency range of the video data by this filter 17, the compression coding efficiency in an MPEG encoder 19 on the subsequent stage can be improved.

The MPEG encoder 19 encodes the base band video data outputted from the filter 17 in conformity to the MPEG2 standard, and outputs a coded stream. The MPEG encoder 19 carries out coding processing with two frames as one GOP. The MPEG encoder 19 encodes the first picture as B-picture, which is bidirectionally predicted from past and future I-picture, and encodes the next picture as I-picture, which is obtained by intra-frame coding. Thus, the MPEG encoder 19 generates a coded stream consisting of BIBIBI . . . as shown in FIG. 2. In addition, the MPEG encoder 19 detects the quantity of bits generated in coding each GOP, and controls the quantization step size and the quantization scale in accordance with the detection result so that the quantity of generated bits for each GOP corresponds to 10 tracks. Thus, the MPEG encoder 19 can generate a coded stream having a fixed quantity of bits for each GOP.

The ECC encoder 20 receives the coded stream outputted from the MPEG encoder 19, then generates an error correction code (ECC) in the form of product code based on one GOP as a unit with respect to the coded stream, and generates a coded stream having the error correction code added thereto. The ECC encoder 20 carries out processing for forming the coded stream having the ECC added thereto based on the coded stream of one GOP as a unit. In addition, the ECC encoder 20 receives the audio data outputted from the switching circuit 16, then generates an error correction code with respect to the audio data corresponding to the coded video stream of one GOP, and generates audio data having the error correction code added thereto. Similarly, the ECC encoder 20 receives system data from the system controller 13, then generates an error correction code in the form of product code by each GOP of the coded video stream, and forms system data having the error correction coded added thereto.

The error correction code to be added to the video coded stream and the audio data is made of an outer code parity and inner code parity, and the error correction code to be added to the system data is made only of an inner code parity.

As described with reference to FIG. 1, the video tape recorder 10 in this embodiment records the coded video stream having the error correction code added thereto and the audio data having the error correction code added thereto onto 10 recording tracks in a dispersed manner. Therefore, the error correction code has such an error correction capability that even when video data and audio data of two tracks cannot be reproduced from the magnetic tape, the video data of the two tracks that cannot be reproduced can be reproduced by using the error correction codes of the video data and audio data reproduced from the remaining eight tracks. In short, in the ECC encoder 20, the code capability and code length of the error correction code are set so that the original video data and audio data can be decoded to a practically sufficient degree by carrying out error correction processing of reproduced data obtained from at least eight recording tracks of the 10 recording tracks.

Moreover, the ECC encoder 20 carries out shuffling processing by shuffling the arrangement of the coded video stream having the error correction code added thereto and the audio data having the error correction code added thereto, for each predetermined block unit. In addition, the ECC encoder 20 adds identification data ID to the shuffled predetermined block and outputs the resulting block. The identification data ID is data to be added for reproducing the coded video stream having the error correction code added thereto and the audio data having the error correction code added thereto by de-shuffling the reproduced data from the magnetic tape.

A recording circuit 23 generates recording data by carrying out modulation and amplification of the coded video stream, audio data and system data outputted from the ECC encoder 20, under the control of the system controller 13, and supplies the generated recording data to the recording heads RECA, RECB in accordance with a recording timing control signal supplied from the system controller 13. Specifically, when the recording timing control signal is at a high level, the recording data generated by the recording circuit 23 is recorded onto the magnetic tape 1 by overwriting through the recording heads RECA, RECB. When the recording timing control signal is at a low level, the recording data generated by the recording circuit 23 is not outputted from the recording circuit 23. Therefore, the recording data is not recorded onto the magnetic tape 1. The recording timing control signal supplied from the system controller 13 will be later described in detail.

In the video tape recorder 10 of the present embodiment, a fixed delay tim for 8.47 frames is generated by a recording processing system which is constituted by the filter 17, the MPEG encoder 19, the ECC encoder 20 and the recording circuit 23.

Reproducing circuits 24 and 25 output reproduced data by amplifying and wave-shaping reproduced signals obtained from the monitor heads PBA, PBB and from the advanced reading heads ADA1 to ADB2, respectively.

In the video tape recorder of the present embodiment, while recording operation for recording data onto the magnetic tape by the recording heads RECA and RECB is carried out, the data recorded on the magnetic tape 1 by the recording heads RECA and RECB are immediately reproduced by the monitor heads PBA and PBB. Thus, the data recorded on the magnetic tape 1 can be monitored. A reproduced signal processing circuit 26 outputs reproduced data by synthesizing the reproduced signals from the monitor heads PBA, PBB outputted from the reproducing circuit 24, at the time of data recording. The reason for synthesizing reproduced signals from the two monitor heads PBA, PBB to provide one reproduced data is as follows. That is, if reproduced data is generated from the signals reproduced from one monitor head, data of the recording track cannot be accurately reproduced in the case where tracking of the recording track with respect to the monitor head is deviated.

At the time of data reproduction, the reproduced signal processing circuit 26 generates reproduced data by synthesizing reproduced signals of the advanced heads ADA1 and ADB1 outputted from the reproducing circuit 25, and generates reproduced data by synthesizing reproduced signals of the advanced reading heads ADA2 and ADB2. The reproduced data outputted from the reproduced signal processing circuit 26 is the same as the data outputted from the ECC encoder 20.

An inner code decoder 27 receives the reproduced coded video stream, reproduced audio data and reproduced system data outputted from the reproduced signal processing circuit 26, and carries out error correction processing of the reproduced coded video stream by using the inner code parity added to the reproduced video data as an error correction code. The inner code decoder 27 then outputs the error-corrected reproduced coded video stream together with the error correction processing result. Also, the inner code decoder 27 carries out error correction processing of the reproduced audio data by using the inner code parity added to the reproduced audio data as an error correction code, and outputs the error-corrected reproduced audio data together with the error correction result. In addition, the inner code decoder 27 carries out error correction processing of the reproduced system data by using the inner code parity added to the reproduced system data, and supplies the error-corrected reproduced system data to the system controller 13.

The outer code decoder 28 is a circuit for receiving the coded video stream and audio data outputted from the inner code decoder 27 and carrying out error correction processing of the coded video stream and audio data on the basis of the outer code parity added to the respective data. Specifically, the outer code decoder 28 stores the coded video stream outputted from the inner code decoder 27 into a built-in memory thereof, and carries out error correction processing by using the outer code parity added to the coded video stream. The coded video stream on which error correction processing has been carried out by the outer code parity is supplied to the MPEG decoder 29. Also, the outer code decoder 28 stores the audio data outputted from the inner code decoder 27 into the built-in memory, and carries out error correction processing by using the outer code parity added to the audio data. The audio data on which error correction processing has been carried out by the outer code parity is supplied to the I/O processing circuit and the switching circuit 16.

The MPEG decoder 29 receives the coded video stream outputted from the outer code decoder 28, then decodes the coded video stream in accordance with the MPEG2 standard, and generates base band video data. The base band video data decoded by the MPEG decoder 29 is supplied to the I/O processing circuit 14 and the switching circuit 15.

In the video tape recorder 10 of the present embodiment, a fixed delay time for 4.64 frames is generated in a reproduction processing system which is constituted by the reproducing circuits 24, 25, the reproduced signal processing circuit 26, the inner code decoder 27, the outer code decoder 28 and the MPEG decoder 29.

In short, in the video tape recorder 10 of the present embodiment, a system delay for 13.2 frames corresponding to 66 tracks is generated by combining the delay times in the recording processing system and the reproduction processing system.

The control by the system controller 13 in carrying out insertion editing for newly inserting video data into the original video data recorded on the magnetic tape will now be described in detail with reference to FIGS. 6A to 11G.

FIGS. 6A to 6H are time charts showing the timing of output data and a recording control signal in insertion editing processing. FIG. 6A shows a coded video stream $ST_{ORG}$ reproduced from the magnetic tape by the advanced reading heads ADA1 to ADB2. FIG. 6B shows original video data $V_{ORG}$ of the base band outputted from the MPEG decoder 29. FIG. 6C shows insertion video data $V_{INS}$ of the base band to be inserted into the original video data $V_{ORG}$. FIG. 6D shows edited video data $V_{EDIT}$ of the base band outputted from the switching circuit 15. FIG. 6E shows an edited coded stream $ST_{EDIT}$ outputted from the ECC encoder 20. FIG. 6F shows a recording timing control signal $RT_V$ for controlling the recording timing of the edited coded video stream. FIG. 6G shows a recording timing control signal $RT_S$ for controlling the recording timing of the system data. FIG. 6H shows a recording timing control signal $RT_A$ for controlling the recording timing of the audio data.

In the following description, a coded stream which is already recorded on the magnetic tape before carrying out insertion editing processing is referred to as an original coded stream.

In the example shown in FIG. 6A, IN-point is set between a picture B2 and a picture I3 in the original coded stream $ST_{ORG}$, and OUT-point is set between a picture B8 and a picture I9. In this example, insertion video data $V_{INS}$ supplied from an external unit is inserted between the picture I3 and the picture B8 of the original video data $V_{ORG}$ obtained by MPEG-decoding the original coded stream $ST_{ORG}$ reproduced from the magnetic tape.

As described already, in the video tape recorder of the present embodiment, since the delay time for 4.64 frames is generated in the reproduction processing system which is constituted by the reproducing circuits 24, 25, the reproduced signal processing circuit 26, the inner code decoder 27, the outer code decoder 28 and the MPEG decoder 29, the base band video data $V_{ORG}$ outputted from the MPEG decoder 29 is delayed by 4.64 frames with respect to the original coded stream $ST_{ORG}$ reproduced from the magnetic tape.

In the base band video data $V_{ORG}$ outputted from the MPEG decoder 29, IN-point is set between the picture B2 and the picture I3 and OUT-point is set between the picture B8 and the picture I9, as shown in FIG. 6B. When insertion editing is carried out for inserting video data from a picture I3' to a picture B8' of the insertion video data into a section designated by the IN-point and OUT-point as shown in FIG. 6C, the edited video data $V_{EDIT}$ as shown in FIG. 6D is generated.

Practically, this insertion editing is carried out as the system controller 13 controls the switching operation of the switching circuits 15 and 16 at the timing of IN-point and OUT-point. Specifically, during the period up to IN-point, the terminal of the switching circuit 15 is connected to the lower terminal, and the base band video data $V_{ORG}$ reproduced from the magnetic tape is outputted as the edited video data $V_{EDIT}$ from the switching circuit 15. During the period from IN-point to OUT-point, the terminal of the switching circuit 15 is connected to the upper terminal, and the insertion video data $VN_{INS}$ is outputted as the edited video data $V_{EDIT}$ from the switching circuit 15. During the period after OUT-point, the terminal of the switching circuit 15 is connected again to the lower terminal, and the base band video data $V_{ORG}$ reproduced from the magnetic tape is outputted again as the edited video data $V_{EDIT}$ from the switching circuit 15. As a result of such switching operation of the switching circuit 15, the edited video data $V_{EDIT}$ as shown in FIG. 6D is generated.

The edited video data $V_{EDIT}$ is supplied to the MPEG encoder 19 through the filter circuit 17. The MPEG encoder 19 encodes the edited video data $V_{EDIT}$ in conformity to the MPEG2 standard and outputs the resultant data as the edited coded stream $ST_{EDIT}$, as described already. The ECC encoder 20 adds an error correction code to the edited coded stream $ST_{EDIT}$ and outputs the resultant coded stream as the edited coded stream $ST_{EDIT}$ having the error correction code added thereto, as shown in FIG. 6E.

Since the fixed delay for 8.4 frames is generated in the recording processing system which is constituted by the filter 17, the MPEG encoder 19 and the ECC encoder 20, the edited coded stream $ST_{EDIT}$ outputted from the ECC encoder 20 is delayed by 8.4 frames with respect to the edited video data $V_{EDIT}$ outputted from the switching circuit 15, as relatively shown in FIGS. 6D and 6E. In short, the edited coded stream $ST_{EDIT}$ to be recorded onto the magnetic tape is delayed by 6.6 GOP with respect to the original coded video stream $ST_{ORG}$ reproduced from the magnetic tape.

In the video tape recorder 10 of the present embodiment, the advanced reading heads ADA1 and ADB1 are advanced by 6.6 GOP with respect to the recording heads RECA and RECB, as described in FIG. 4. Therefore, when the data stream reproduced from the advanced heads ADA1 and ADB1 is supplied to the recording heads RECA and RECB through the reproduction processing system and the recording processing system, the magnetic head drum is rotated for a predetermined number of times and the magnetic tape is moved on the magnetic head by a predetermined amount, during that period. Thus, the data stream can be recorded at perfectly the same position on the magnetic tape by the recording heads RECA and RECB.

In the example shown in FIGS. 6A to 6H, when the original picture B2 is reproduced from the magnetic tape by the advanced reading heads ADA1 and ADB1 and then a new picture B2 obtained by decoding processing in the reproduction processing system and encoding processing in the recording processing system is recorded onto the magnetic tape by the recording heads RECA and RECB, the recording position on the magnetic tape where the original picture B2 was recorded and the recording position of the newly obtained picture B2 are perfectly the same.

That is, in the example of FIGS. 6A to 6H, the recording position on the magnetic tape of the picture I3 of the original coded stream and the recording position on the magnetic tape of the picture I3' of the edited coded stream are perfectly the same. Thus, insertion editing processing is carried out by recording the pictures I3', B4', I5', B6', I7' and B8' of the edited coded stream at the same positions as those of the pictures I3, B4, I5, B6, I7 and B8 of the original coded stream by overwriting.

With reference to FIGS. 7A to 7G, the timing for recording the coded video stream, the timing for recording the system data and the timing for recording the audio data in the case where this insertion editing is carried out will now be described. FIG. 7A shows original data $V_{ORG}$ of the base band outputted from the MPEG decoder 29. FIG. 7B shows insertion video data $V_{INS}$ of the base band to be inserted into the original video data $V_{ORG}$. FIG. 7C shows edited video data $V_{EDIT}$ of the base band outputted from the switching circuit 15. FIG. 7D shows an edited coded stream $ST_{EDIT}$ outputted from the ECC encoder 20. FIG. 7E shows a recording timing control signal $RT_V$ for controlling the recording timing of the edited coded video stream. FIG. 7F shows a recording timing control signal $RT_S$ for controlling the recording timing of the system data. FIG. 7G shows a recording timing control signal $RT_A$ for controlling the recording timing of the audio data.

Since FIGS. 7A to 7G are views for explaining the recording timing control signal $RT_V$ at IN-point, the timing of OUT-point is not described.

In carrying out insertion editing, the system controller 13 controls the recording circuit 23 to record the edited coded stream $ST_{EDIT}$ onto the magnetic tape in accordance with the recording timing control signal $RT_V$ shown in FIG. 7E, instead of recording all the edited coded streams $ST_{EDIT}$ outputted from the ECC encoder 20 onto the magnetic tape.

In this case, the pictures from IN-point (i.e., pictures from the picture I3') of the insertion video data $VN_{INS}$ are recorded onto the magnetic tape by overwriting, but a picture B0 and a picture I1 of the edited coded stream $ST_{EDIT}$ are not recorded onto the magnetic tape. This is because a picture B0 and a picture I1 of the original coded stream $ST_{ORG}$ are already recorded on the magnetic tape. Since the picture B0 and picture I1 of the edited coded stream $ST_{EDIT}$ which is re-encoded are processed by MPEG decoding processing and MPEG re-encoding processing, the picture quality of these pictures is slightly deteriorated from that of the picture B0 and picture I1 of the original coded stream $ST_{ORG}$. Therefore, it is not necessary to record the picture B0 and picture I1 of the slightly deteriorated picture quality by overwriting the picture B0 and picture I1 of the original coded stream $ST_{ORG}$ of the good picture quality.

In the video tape recorder of the present embodiment, on the basis of the recording timing control signal $RT_V$ shown in FIG. 7E, the picture B2 of the edited coded stream $ST_{EDIT}$ is recorded to overwrite the picture B2 of the original coded stream $ST_{ORG}$ recorded on the magnetic tape. This is because the picture B2 of the edited coded stream $ST_{EDIT}$ is different from the picture B2 of the original coded stream $ST_{ORG}$ already recorded on the magnetic tape. The reason why the picture B2 of the edited coded stream $ST_{EDIT}$ is different from the picture B2 of the original coded stream $ST_{ORG}$ already recorded on the magnetic tape will be described hereinafter.

The picture B2 of the original coded stream $ST_{ORG}$ recorded on the magnetic tape is a picture predictively coded from both the future picture I1 and the past picture I3, and the picture B2 of the edited coded stream $ST_{EDIT}$ generated by insertion editing processing is a picture predictively coded from both the future picture I1 and the past picture I3'. That is, since these pictures are based on different prediction target pictures, the DCT coefficient and coding parameter of the picture B2 of the edited coded stream $ST_{EDIT}$ are different from the DCT coefficient and coding parameter of the picture B2 of the original coded stream $ST_{ORG}$ already recorded on the magnetic tape.

Also, in the video tape recorder of the embodiment of the present invention, coding processing is carried out so that a coded stream for one GOP corresponds to the data quantity for 10 tracks, as described above. In short, the original coded stream $ST_{ORG}$ is a stream which is coded so that the data quantity obtained by combining the data quantity of the picture B2 and the data quantity of the picture I3 in this stream corresponds to the data quantity for 10 tracks. The edited coded stream $ST_{EDIT}$ generated by insertion editing is a stream which is re-encoded so that the data quantity obtained by combining the quantity of generated data of the picture B2 and the quantity of generated data of the picture I3' in this stream corresponds to the data quantity for 10 tracks. As a result, the data quantity of the picture B2 of the original coded stream $ST_{ORG}$ and the data quantity of the picture B2 of the edited coded stream are totally different from each other.

The system controller 13 controls the recording circuit 23 to rewrite the picture B2 of the original coded stream $ST_{ORG}$ recorded on the magnetic tape by the picture B2 of the edited coded stream $ST_{EDIT}$ which is encoded by insertion editing. In short, the system controller 13 generates the recording timing control signal $RT_V$ for rewriting the picture B2 and supplies this recording timing control signal $RT_V$ to the recording circuit 23, thereby rewriting the picture. B2 of the original coded stream $ST_{ORG}$ recorded on the magnetic tape by the picture B2 of the edited coded stream $ST_{EDIT}$ which is encoded by insertion editing.

When the recording timing control signal $RT_V$ supplied from the system controller 13 is at a low level, the recording circuit 23 does not carry out processing for recording the edited coded stream $ST_{EDIT}$ supplied from the ECC encoder 20 onto the magnetic tape. When the recording timing control signal $RT_V$ supplied from the system controller 13 is at a high level, the recording circuit 23 carries out processing for recording the edited coded stream $ST_{EDIT}$ supplied from the ECC encoder 20 onto the magnetic tape by overwriting.

Moreover, the system controller 13 controls the recording circuit 23 to record the system data supplied from the ECC encoder 20 on the basis of the recording timing control signal $RT_S$ with respect to the system data shown in FIG. 7F. That is, processing for recording the system data by overwriting advanced by one GOP from the recording timing of the coded stream is carried out, instead of starting recording of the system data at the same timing as that of the coded video stream described in FIG. 7E. In the video tape recorder of the present embodiment, to carry out variable-speed reproduction, identification ID of the preceding GOP and identification ID of the subsequent GOP are recorded as the system data.

Since GOP1 consisting of the picture B2 and picture I3' is rewritten by this insertion editing, identification ID of GOP1 is changed. Thus, to change the identification ID of GOP1 described in the system data of GOP0, overwrite processing for recording the system data is carried out at the timing advanced by one GOP from the recording timing of the coded stream.

In addition, the system controller 13 controls the recording circuit 23 to record the audio data supplied from the ECC encoder 20 on the basis of the recording timing control signal $RT_A$ with respect to the audio data shown in FIG. 7G. Since the audio data is not compression-coded, the system delay in the reproduction processing system and the recording processing system is smaller than that of the video data. Therefore, the recording timing of the audio data at IN-point may be equal to the recording timing of the coded video stream.

With reference to FIGS. 8A to 8G, the timing for recording the coded video stream, the timing for recording the system data and the timing for recording the audio data at OUT-point in this insertion editing will now be described. FIG. 8A shows original data $V_{ORG}$ of the base band outputted from the MPEG decoder 29. FIG. 8B shows insertion video data $V_{INS}$ of the base band to be inserted into the original video data $V_{ORG}$. FIG. 8C shows edited video data $V_{EDIT}$ of the base band outputted from the switching circuit 15. FIG. 8D shows an edited coded stream $ST_{EDIT}$ outputted from the ECC encoder 20. FIG. 8E shows a recording timing control signal $RT_V$ for controlling the recording timing of the edited coded video stream. FIG. 8F shows a recording timing control signal $RT_S$ for controlling the recording timing of the system data. FIG. 8G shows a recording timing control signal $RT_A$ for controlling the recording timing of the audio data.

Since FIGS. 8A to 8G are views for explaining the recording timing control signal at OUT-point, the timing of IN-point is not described.

The system controller 13 controls the recording circuit 23 to record the edited coded stream $ST_{EDIT}$ outputted from the ECC encoder 20 onto the magnetic tape on the basis of the recording timing control signal $RT_V$. As described with reference to FIGS. 7A to 7G, the system controller 13 does not record all the edited coded streams $ST_{EDIT}$ outputted from the ECC encoder 20 onto the magnetic tape. Actually, the pictures up to OUT-point (i.e., pictures up to the picture B6') of the insertion video data are recorded onto the magnetic tape by overwriting, but a picture B10 and a picture I11 of the edited coded stream $ST_{EDIT}$ are not recorded onto the magnetic tape. This is because a picture B10 and a picture I11 of the original coded stream $ST_{ORG}$ are already recorded on the magnetic tape. Since the picture B10 and picture I11 of the edited coded stream $ST_{EDIT}$ are processed by MPEG decoding processing and MPEG re-encoding processing, the picture quality of these pictures is slightly deteriorated from that of the picture B10 and picture I11 of the original coded stream $ST_{ORG}$. Therefore, it is not necessary to record the picture B10 and picture I11 of the slightly deteriorated picture quality by overwriting the picture B10 and picture I11 of the original coded stream $ST_{ORG}$ of the good picture quality.

However, pictures I7, B8 and I9 of the edited coded stream $ST_{EDIT}$ outputted from the ECC encoder 20 are recorded onto the magnetic tape by overwriting on the basis of the recording timing control signal $RT_V$. This is because the DCT coefficients, coding parameters and quantities of generated data of the pictures I7, B8 and I9 of the edited coded stream $ST_{EDIT}$ generated by insertion editing are totally different from those of the pictures I7, B8 and I9 of the original coded stream $ST_{ORG}$ already recorded on the magnetic tape.

In the video tape recorder of the embodiment of the present invention, the MPEG encoder 19 encodes the picture B6' and the picture I7 so that the data quantity obtained by combining the quantity of generated bits of the picture B6' and the quantity of generated bits of the picture I7 of the edited coded stream $ST_{EDIT}$ obtained by insertion editing processing corresponds to the data quantity for 10 tracks. In short, the data quantity obtained by combining the quantity of generated data of the picture B6 and the quantity of generated data of the picture I7 in the original coded stream $ST_{ORG}$ corresponds to the data quantity for 10 tracks. The data quantity obtained by combining the quantity of generated data of the picture B6' and the quantity of generated data of the picture I7 in the edited coded stream $ST_{EDIT}$ corresponds to the data quantity for 10 tracks. Thus, the quantity of generated data of the picture I7 of the edited coded stream $ST_{EDIT}$ generated by re-encoding processing by the MPEG encoder 19 in insertion editing and the quantity of generated data of the picture I7 of the original coded stream $ST_{ORG}$ recorded on the magnetic tape are totally different from each other.

The picture B8 of the original coded stream $ST_{ORG}$ is a picture predictively coded bidirectionally from the picture I7 of the original coded stream $ST_{ORG}$ and the picture I9 of the original coded stream $ST_{ORG}$. However, as described above, the picture B8 of the edited coded stream $ST_{EDIT}$ is a picture predictively coded from the picture I7 re-encoded by the MPEG encoder 19 and the picture I9 re-encoded by the MPEG encoder 19. Therefore, the prediction target picture of the picture B8 of the original coded stream $ST_{ORG}$ and the prediction target picture of the picture B8 of the edited coded stream $ST_{EDIT}$ are different from each other.

The data quantity obtained by combining the quantity of generated data of the picture B8 and the quantity of generated data of the picture I9 of the original coded stream $ST_{ORG}$ corresponds to the data quantity for 10 tracks, and the data quantity obtained by combining the quantity of generated data of the picture B8 and the quantity of generated data of the picture I9 of the edited coded stream $ST_{EDIT}$ corresponds to the data quantity for 10 tracks. Therefore, the quantity of generated data of the picture I9 of the edited coded stream $ST_{EDIT}$ generated by re-encoding by the MPEG encoder 19 in insertion editing is different from the quantity of generated data of the picture I9 of the original coded stream $ST_{ORG}$ recorded on the magnetic tape.

As described above, the pictures I7, B8 and I9 of the edited coded stream $ST_{EDIT}$ generated by insertion editing are different from the pictures I7, B8 and I9 of the original coded stream $ST_{ORG}$ recorded on the magnetic tape in terms of the quantity of generated data, the prediction target picture and the coding parameter. Therefore, the system controller 13 controls the recording circuit 23 to rewrite the pictures I7, B8 and I9 of the original coded stream $ST_{ORG}$ recorded on the magnetic tape by the pictures I7, B8 and I9 of the edited coded stream $ST_{EDIT}$ generated by insertion editing, on the basis of the recording timing control signal $RT_V$.

Moreover, the system controller 13 controls the recording circuit 23 to record the system data supplied from the ECC encoder 20 on the basis of the recording timing control signal $RT_S$ with respect to the system data shown in FIG. 8F. That is, processing for ending overwrite-recording of the system data delayed by one GOP from the recording timing of the coded stream is carried out, instead of ending recording of the system data at the same timing as that of the coded video stream described in FIG. 8E. In the video tape recorder of the present embodiment, to carry out variable-speed reproduction, identification ID of the preceding GOP and identification ID of the subsequent GOP are recorded as the system data. That is, since GOP4 consisting of the picture B8 and picture I9 of the edited coded stream $ST_{EDIT}$ is rewritten by this insertion editing, the system data corresponding to GOP5 is rewritten so as to change identification ID of GOP4 to be recorded as the system data of GOP5.

In addition, the system controller 13 controls the recording circuit 23 to record the audio data supplied from the ECC encoder 20 on the basis of the recording timing control signal $RT_A$ with respect to the audio data shown in FIG. 8G. Since the audio data is not compression-coded, the system delay in the reproduction processing system and the recording processing system is smaller than that of the video data. Therefore, the recording timing of the audio data at OUT-point may be equal to the recording timing of the coded video stream.

FIGS. 9A to 9H are time charts showing the timing of output data and a recording control signal in another insertion editing processing which is different from insertion editing processing described in FIGS. 6A to 6H. FIG. 9A shows a coded video stream $ST_{ORG}$ reproduced from the magnetic tape by the advanced reading heads ADA1 to ADB2. FIG. 9B shows original video data $V_{ORG}$ of the base band outputted from the MPEG decoder 29. FIG. 9C shows insertion video data $V_{INS}$ of the base band to be inserted into the original video data $V_{ORG}$. FIG. 9D shows edited video data $V_{EDIT}$ of the base band outputted from the switching circuit 15. FIG. 9E shows an edited coded stream $ST_{EDIT}$ outputted from the ECC encoder 20. FIG. 9F shows a recording timing control signal $RT_V$ for controlling the recording timing of the edited coded video stream. FIG. 9G shows a recording timing control signal $RT_S$ for controlling the recording timing of the system data. FIG. 9H shows a recording timing control signal $RT_A$ for controlling the recording timing of the audio data.

In the example shown in FIG. 9A, IN-point is set between a picture I1 and a picture B2 in the original coded stream $ST_{ORG}$, and OUT-point is set between a picture I7 and a picture B8. In this example, insertion video data $V_{INS}$ supplied from an external unit is inserted between the picture B2 and the picture I7 of the original video data $V_{ORG}$ obtained by MPEG-decoding the original coded stream $ST_{ORG}$ reproduced from the magnetic tape.

As described already, in the video tape recorder of the present embodiment, since the delay time for 4.64 frames is generated in the reproduction processing system which is constituted by the reproducing circuits 24, 25, the reproduced signal processing circuit 26, the inner code decoder 27, the outer code decoder 28 and the MPEG decoder 29, the base band video data $V_{ORG}$ outputted from the MPEG decoder 29 is delayed by 4.64 frames with respect to the original coded stream $ST_{ORG}$ reproduced from the magnetic tape.

In the base band video data $V_{ORG}$ outputted from the MPEG decoder 29, IN-point is set between the picture I1 and the picture B2 and OUT-point is set between the picture I7 and the picture B8, as shown in FIG. 9B. When insertion editing is carried out for inserting video data from a picture B2' to a picture I7' of the insertion video data into a section designated by the IN-point and OUT-point as shown in FIG. 9C, the edited video data $V_{EDIT}$ as shown in FIG. 9D is generated.

Practically, this insertion editing is carried out as the system controller 13 controls the switching operation of the switching circuits 15 and 16 at the timing of IN-point and OUT-point. Specifically, during the period up to IN-point, the terminal of the switching circuit 15 is connected to the lower terminal, and the base band video data $V_{ORG}$ reproduced from the magnetic tape is outputted as the edited video data $V_{EDIT}$ from the switching circuit 15. During the period from IN-point to OUT-point, the terminal of the switching circuit 15 is connected to the upper terminal, and the insertion video data $V_{INS}$ is outputted as the edited video data $V_{EDIT}$ from the switching circuit 15. During the period after OUT-point, the terminal of the switching circuit 15 is connected again to the lower terminal, and the base band video data $V_{ORG}$ reproduced from the magnetic tape is outputted again as the edited video data $V_{EDIT}$ from the switching circuit 15. As a result of such switching operation of the switching circuit 15, the edited video data $V_{EDIT}$ as shown in FIG. 9D is generated.

The edited video data $V_{EDIT}$ is supplied to the MPEG encoder 19 through the filter circuit 17. The MPEG encoder 19 encodes the edited video data $V_{EDIT}$ in conformity to the MPEG2 standard and outputs the coded MPEG stream as the edited coded stream $ST_{EDIT}$, as described already. The ECC encoder 20 adds an error correction code to the edited coded stream $ST_{EDIT}$ and outputs the resultant coded stream as the edited coded stream $ST_{EDIT}$ having the error correction code added thereto, as shown in FIG. 9E.

Since the fixed delay for 8.4 frames is generated in the recording processing system which is constituted by the filter 17, the MPEG encoder 19 and the ECC encoder 20, the edited coded stream $ST_{EDIT}$ outputted from the ECC encoder 20 is delayed by 8.4 frames with respect to the edited video data $V_{EDIT}$ outputted from the switching circuit 15, as relatively shown in FIGS. 9D and 9E. In short, the edited coded stream $ST_{EDIT}$ to be recorded onto the magnetic tape is delayed by 6.6 GOP with respect to the original coded video stream $ST_{ORG}$ reproduced from the magnetic tape.

In the video tape recorder 10 of the present embodiment, the advanced reading heads ADA1 and ADB1 are advanced by 6.6 GOP with respect to the recording heads RECA and RECB, as described in FIG. 4. Therefore, when the data stream reproduced from the advanced heads ADA1 and ADB1 is supplied to the recording heads RECA and RECB through the reproduction processing system and the recording processing system, the magnetic head drum is rotated for a predetermined number of times and the magnetic tape is moved on the magnetic head by a predetermined amount, during that period. Thus, the data stream can be recorded at perfectly the same position on the magnetic tape by the recording heads RECA and RECB.

In the example shown in FIGS. 9A to 9H, on the assumption that the original picture B0 is reproduced from the magnetic tape by the advanced reading heads ADA1 and ADB1 and then a new picture B0 obtained by decoding processing in the reproduction processing system and encoding processing in the recording processing system is recorded onto the magnetic tape by the recording heads RECA and RECB, the recording position on the magnetic tape where the original picture B0 was recorded and the recording position of the newly obtained picture B0 are perfectly the same.

That is, in the example of FIGS. 9A to 9H, the recording position on the magnetic tape of the picture B2 of the original coded stream and the recording position on the magnetic tape of the picture B2' of the edited coded stream are perfectly the same. Thus, insertion editing processing is carried out by recording the pictures B2', I3', B4', I5', B6' and I7' of the edited coded stream at the same positions as those of the pictures B2, I3, B4, I5, B6 and I7 of the original coded stream by overwriting.

With reference to FIGS. 10A to 10G, the timing for recording the coded video stream, the timing for recording the system data and the timing for recording the audio data in the case where this insertion editing is carried out will now be described. FIG. 10A shows original data $V_{ORG}$ of the base band outputted from the MPEG decoder 29. FIG. 10B shows insertion video data $V_{INS}$ of the base band to be inserted into the original video data $V_{ORG}$. FIG. 10C shows edited video data $V_{EDIT}$ of the base band outputted from the switching circuit 15. FIG. 10D shows an edited coded stream $ST_{EDIT}$ outputted from the ECC encoder 20. FIG. 10E shows a recording timing control signal $RT_V$ for controlling the recording timing of the edited coded video stream. FIG. 10F shows a recording timing control signal $RT_S$ for controlling the recording timing of the system data. FIG. 10G shows a recording timing control signal $RT_A$ for controlling the recording timing of the audio data.

Since FIGS. 10A to 10G are views for explaining the recording timing control signal $RT_V$ at IN-point, the timing of OUT-point is not described.

In carrying out insertion editing, the system controller 13 controls the recording circuit 23 to record the edited coded stream $ST_{EDIT}$ onto the magnetic tape in accordance with the recording timing control signal $RT_V$ shown in FIG. 10E, instead of recording all the edited coded streams $ST_{EDIT}$ outputted from the ECC encoder 20 onto the magnetic tape.

In this case, the pictures from IN-point (i.e., pictures from the picture B2') of the insertion video data $V_{INS}$ are recorded onto the magnetic tape by overwriting, but a picture B0 and a picture I1 of the edited coded stream $ST_{EDIT}$ are not recorded onto the magnetic tape. This is because a picture B0 and a picture I1 of the original coded stream $ST_{ORG}$ are already recorded on the magnetic tape. Since the picture B0 and picture I1 of the edited coded stream $ST_{EDIT}$ which is re-encoded are processed by MPEG decoding processing and MPEG re-encoding processing, the picture quality of these pictures is slightly deteriorated from that of the picture B0 and picture I1 of the original coded stream $ST_{ORG}$. Therefore, it is not necessary to record the picture B0 and picture I1 of the slightly deteriorated picture quality by overwriting the picture B0 and picture I1 of the original coded stream $ST_{ORG}$ of the good picture quality.

Meanwhile, in the example shown in FIGS. 7A to 7G, the picture B2 immediately before IN-point in the edited coded stream $ST_{EDIT}$ is recorded onto the magnetic tape by overwriting in accordance with the recording timing control signal $RT_V$. This is because the picture B2 immediately before IN-point in the edited coded stream $ST_{EDIT}$ generated as a result of insertion editing processing is different from the picture B2 of the original coded stream $ST_{ORG}$ recorded on the magnetic tape.

However, in the example shown in FIGS. 10A to 10G, the picture I1 immediately before IN-point in the edited coded stream $ST_{EDIT}$ is not recorded onto the magnetic tape by overwriting. This is because the picture I1 immediately before IN-point in the edited coded stream $ST_{EDIT}$ generated as a result of insertion editing processing is the same as the picture I1 of the original coded stream $ST_{ORG}$ recorded on the magnetic tape. In other words, the picture I1 immediately before IN-point in the edited coded stream $ST_{EDIT}$ generated as a result of insertion editing processing is a picture which is not affected by insertion editing processing.

When the recording timing control signal $RT_V$ supplied from the system controller 13 is at a low level, the recording circuit 23 does not carry out processing for recording the edited coded stream $ST_{EDIT}$ supplied from the ECC encoder 20 onto the magnetic tape. When the recording timing control signal $RT_V$ supplied from the system controller 13 is at a high level, the recording circuit 23 carries out processing for recording the edited coded stream $ST_{EDIT}$ supplied from the ECC encoder 20 onto the magnetic tape by overwriting.

Moreover, the system controller 13 controls the recording circuit 23 to record the system data supplied from the ECC encoder 20 on the basis of the recording timing control signal $RT_S$ with respect to the system data shown in FIG. 10F. That is, processing for recording the system data by overwriting advanced by one GOP from the recording timing of the coded stream is carried out, instead of starting recording of the system data at the same timing as that of the coded video stream described in FIG. 10E. In the video tape recorder of the present embodiment, to carry out variable-speed reproduction, identification ID of the preceding GOP and identification ID of the subsequent GOP are recorded as the system data.

Since GOP1 consisting of the picture B2 and picture I3' is rewritten by this insertion editing, identification ID of GOP1 is changed. Thus, to change the identification ID of GOP1 described in the system data of GOP0, overwrite processing for recording the system data is carried out at the timing advanced by one GOP from the recording timing of the coded stream.

In addition, the system controller 13 controls the recording circuit 23 to record the audio data supplied from the ECC encoder 20 on the basis of the recording timing control signal $RT_A$ with respect to the audio data shown in FIG. 10G. Since the audio data is not compression-coded, the system delay in the reproduction processing system and the recording processing system is smaller than that of the video data. Therefore, the recording timing of the audio data at IN-point may be equal to the recording timing of the coded video stream.

With reference to FIGS. 11A to 11G, the timing for recording the coded video stream, the timing for recording the system data and the timing for recording the audio data at OUT-point in this insertion editing will now be described. FIG. 11A shows original data $V_{ORG}$ of the base band outputted from the MPEG decoder 29. FIG. 11B shows insertion video data $V_{INS}$ of the base band to be inserted into the original video data $V_{ORG}$. FIG. 11C shows edited video data $V_{EDIT}$ of the base band outputted from the switching circuit 15. FIG. 11D shows an edited coded stream $ST_{EDIT}$ outputted from the ECC encoder 20. FIG. 11E shows a recording timing control signal $RT_V$ for controlling the recording timing of the edited coded video stream. FIG. 11F shows a recording timing control signal $RT_S$ for controlling the recording timing of the system data. FIG. 11G shows a recording timing control signal $RT_A$ for controlling the recording timing of the audio data.

Since FIGS. 11A to 11G are views for explaining the recording timing control signal at OUT-point, the timing of IN-point is not described.

The system controller 13 controls the recording circuit 23 to record the edited coded stream $ST_{EDIT}$ outputted from the ECC encoder 20 onto the magnetic tape on the basis of the recording timing control signal $RT_V$. As described with reference to FIGS. 10A to 10G, the system controller 13 does not record all the edited coded streams $ST_{EDIT}$ outputted from the ECC encoder 20 onto the magnetic tape. Actually, the pictures up to OUT-point (i.e., pictures up to the picture I7') of the insertion video data are recorded onto the magnetic tape by overwriting, but a picture B10 and a picture I11 of the edited coded stream $ST_{EDIT}$ are not recorded onto the magnetic tape. This is because a picture B10 and a picture I11 of the original coded stream $ST_{ORG}$ are already recorded on the magnetic tape.

Since the picture B10 and picture I11 of the edited coded stream $ST_{EDIT}$ are processed by MPEG decoding processing and MPEG re-encoding processing, the picture quality of these pictures is slightly deteriorated from that of the picture B10 and picture I11 of the original coded stream $ST_{ORG}$. Therefore, it is not necessary to record the picture B10 and picture I11 of the slightly deteriorated picture quality by overwriting the picture B10 and picture I11 of the original coded stream $ST_{ORG}$ of the good picture quality.

However, pictures B8 and I9 of the edited coded stream $ST_{EDIT}$ outputted from the ECC encoder 20 are recorded onto the magnetic tape by overwriting on the basis of the recording timing control signal $RT_V$. This is because the DCT coefficients, coding parameters and quantities of generated data of the pictures B8 and I9 of the edited coded stream $ST_{EDIT}$ generated by insertion editing are totally different from those of the pictures B8 and I9 of the original coded stream $ST_{ORG}$ recorded on the magnetic tape.

The picture B8 of the original coded stream $ST_{ORG}$ is a picture predictively coded bidirectionally from the picture I7 of the original coded stream $ST_{ORG}$ and the picture I9 of the original coded stream $ST_{ORG}$. However, as described above, the picture B8 of the edited coded stream $ST_{EDIT}$ is a picture predictively coded from the picture I7' re-encoded by the MPEG encoder 19 and the picture I9 re-encoded by the MPEG encoder 19.

Therefore, since the picture I7 as a prediction target of the picture B8 of the original coded stream $ST_{ORG}$ and the picture I7' as a prediction target of the picture B8 of the edited coded stream $ST_{EDIT}$ are different from each other, the coding processing result of the picture B8 of the original coded stream $ST_{ORG}$ and the coding processing result of the picture B8 of the edited coded stream $ST_{EDIT}$ are different from each other.

The data quantity obtained by combining the quantity of generated data of the picture B8 and the quantity of generated data of the picture I9 of the original coded stream $ST_{ORG}$ corresponds to the data quantity for 10 tracks, and the data quantity obtained by combining the quantity of generated data of the picture B8 and the quantity of generated data of the picture I9 of the edited coded stream $ST_{EDIT}$ corresponds to the data quantity for 10 tracks. Therefore, the quantity of generated data of the picture I9 of the edited coded stream $ST_{EDIT}$ generated by re-encoding by the MPEG encoder 19 in insertion editing is different from the quantity of generated data of the picture I9 of the original coded stream $ST_{ORG}$ recorded on the magnetic tape.

As described above, the pictures B8 and I9 of the edited coded stream $ST_{EDIT}$ generated by insertion editing are different from the pictures B8 and I9 of the original coded stream $ST_{ORG}$ recorded on the magnetic tape in terms of the quantity of generated data, the prediction target picture and the coding parameter. Therefore, the system controller 13 controls the recording circuit 23 to rewrite the pictures B8 and I9 of the original coded stream $ST_{ORG}$ recorded on the magnetic tape by the pictures B8 and I9 of the edited coded stream $ST_{EDIT}$ generated by insertion editing, on the basis of the recording timing control signal $RT_V$.

Moreover, the system controller 13 controls the recording circuit 23 to record the system data supplied from the ECC encoder 20 on the basis of the recording timing control signal $RT_S$ with respect to the system data shown in FIG. 1F. That is, processing for ending overwrite-recording of the system data delayed by one GOP from the recording timing of the coded stream is carried out, instead of ending recording of the system data at the same timing as that of the coded video stream described in FIG. 11E. In the video tape recorder of the present embodiment, to carry out variable-speed reproduction, identification ID of the preceding GOP and identification ID of the subsequent GOP are recorded as the system data.

Since GOP4 consisting of the picture B8 and picture I9 of the edited coded stream $ST_{EDIT}$ is rewritten by this insertion editing, identification ID of GOP4 to be recorded as the system data of GOP5 is changed. Therefore, in order to rewrite the identification ID of GOP4 described in the system data of this GOP5, the system controller 13 controls the recording circuit 23 to rewrite the system data corresponding to this GOP on the basis of the recording timing control signal $RT_S$ with respect to the system data.

In addition, the system controller 13 controls the recording circuit 23 to record the audio data supplied from the ECC encoder 20 on the basis of the recording timing control signal $RT_A$ with respect to the audio data shown in FIG. 11G. Since the audio data is not compression-coded, the system delay in the reproduction processing system and the recording processing system is smaller than that of the video data. Therefore, the recording timing of the audio data at OUT-point may be equal to the recording timing of the coded video stream.

With the above-described structure, with respect to the video signals near IN-point and OUT-point, coded data is generated by joining the video signals reproduced from the magnetic tape to the edited video signals, and the coded data is rerecorded onto the magnetic tape, if necessary. In this manner, even when IN-point and OUT-point are set at various points based on the frame as a unit, correctly coded video signals can be recorded onto the magnetic tape. Thus, editing processing based on the frame as a unit can be freely carried out.

In the above-described embodiment, coding is carried out so that GOP consisting of I-picture and B-picture has a constant data quantity. However, this invention is not limited to this embodiment and may be broadly applied to the case where the quantity of generated data is not limited. In this case, too, editing processing based on the frame unit can be carried out by reproducing video signals already recorded on the magnetic tape only with respect to the frames necessary for correct coding processing, as described above.

In addition, in the above-described embodiment, insertion editing is carried out by reproducing video signals by two pairs of advanced reading heads. However, this invention is not limited to this embodiment and may be broadly applied to the case where insertion editing is carried out by reproducing video signals by one pair of advanced reading heads.

Also, in the above-described embodiment, video signals are compression-coded by the technique in conformity to the MPEG standard. However, this invention is not limited to this embodiment and may be broadly applied to the case where data compression coding is carried out by utilizing correlation between frames.

In addition, in the above-described embodiment, video signals are recorded onto the magnetic tape. However, this invention is not limited to this embodiment and may be broadly applied to the case where video signals are continuously or discretely recorded onto various recording media such as optical discs.

As described above, according to the data recording device and the data editing device of the present invention, an original coded stream reproduced from the magnetic tape is temporarily decoded to restore video data of the base band, and original video data and insertion video data are connected to each other in the state of base band video. Therefore, insertion editing based on the frame unit can be carried out in accordance with arbitrarily set edit points.

Also, instead of recording all the edited coded streams generated by coding edited video data edited at the base band level onto the magnetic tape, pictures corresponding to insertion video data and pictures near edit points such as IN-point and OUT-point, from among the edited coded stream, are recorded by overwriting at positions corresponding to the pictures of the original coded stream recorded on the recording medium. In short, only the pictures of the edited coded stream having coding results changed by insertion editing processing are recorded by overwriting onto the magnetic tape. Therefore, deterioration in picture quality of the coded stream which is insertion-edited and rerecorded on the magnetic tape can be minimized.

In addition, according to the data recording device and the data editing device of the present invention, if a picture of the edited coded stream is affected by insertion editing processing and is different from a picture of the original coded stream recorded on the magnetic tape, the picture of the edited coded stream is recorded onto the magnetic tape by overwriting. If the picture of the edited coded stream is not affected by insertion editing processing and is the same as the picture of the original coded stream recorded on the magnetic tape, the picture of the edited coded stream is not recorded onto the magnetic tape. Therefore, even when insertion editing processing is carried out on the frame basis, deterioration in picture quality of the coded stream which is insertion-edited and rerecorded on the magnetic tape can be prevented.

Also, according to the data recording device and the data editing device of the present invention, if the picture immediately before IN-point is I-picture, overwrite recording is started so that pictures from the picture immediately after IN-point are recorded onto the magnetic tape by overwriting. If the picture immediately before IN-point is B-picture, overwrite recording is started so that pictures at least from B-picture as the picture immediately before IN-point are recorded onto the magnetic tape. Therefore, the picture quality of the coded stream which is insertion-edited and recorded on the magnetic tape is not deteriorated, and the picture quality of decoded images is not deteriorated, either.

In the foregoing description, the coding method employed by the MPEG encoder 19 for insertion editing is a particular compression coding method using the BIBI . . . pattern. However, the present invention is not limited to such particular compression coding method and may also be applied to other general compression coding methods. An example of insertion editing by using a general compression coding method will now be described with reference to FIGS. 12A to 12E and FIGS. 13A to 13E.

FIGS. 12A to 12E illustrate processing at IN-point in the case where insertion editing is carried out with respect to a general coded stream which is compression-coded for each 15 pictures as one GOP. FIG. 12A shows original video data $V_{ORG}$ reproduced from the recording medium. FIG. 12B shows insertion video data $V_{INS}$. FIG. 12C shows edited video data $V_{EDIT}$ generated by insertion-editing the insertion video data $V_{INS}$ into the original video data $V_{ORG}$. FIG. 12D shows an edited coded stream $ST_{EDIT}$ obtained by MPEG-coding the edited video data. FIG. 12E shows a recording timing control signal $RT_V$ indicating the recording timing for recording the edited coded stream $ST_{EDIT}$ onto the recording medium by overwriting.

As indicated by arrows in FIG. 12D, a picture B9 immediately before IN-point in the edited coded stream $ST_{EDIT}$ is predictively coded from a picture P8 and a picture P11'. Therefore, the picture B9 of the edited coded stream $ST_{EDIT}$ and a picture B9 of the original coded stream $ST_{ORG}$ recorded on the recording medium are different from each other. Thus, the system controller 13 controls the recording circuit 23 to start overwrite recording with the picture B9 immediately before IN-point in the edited coded stream $ST_{EDIT}$.

In the above-described example, IN-point is set between the picture P8 and the picture B9. Also, in the case where IN-point is set between the picture B9 and the picture B10 and in the case where IN-point is set between the picture B10 and the picture P11, overwrite recording is similarly started with the picture B9 immediately before IN-point in the edited coded stream $ST_{EDIT}$.

FIGS. 13A to 13E illustrate processing at OUT-point in the case where insertion editing is carried out with respect to a general coded stream which is compression-coded for each 15 pictures as one GOP. FIG. 13A shows original video data $V_{ORG}$ reproduced from the recording medium. FIG. 13B shows insertion video data $V_{INS}$. FIG. 13C shows edited video data $V_{EDIT}$ generated by insertion-editing the insertion video data $V_{INS}$ into the original video data $V_{ORG}$. FIG. 13D shows an edited coded stream $ST_{EDIT}$ obtained by MPEG-coding the edited video data. FIG. 13E shows a recording timing control signal $RT_V$ indicating the recording timing for recording the edited coded stream $ST_{EDIT}$ onto the recording medium by overwriting.

As indicated by arrows in FIG. 13D, a picture P8 of the edited coded stream $ST_{EDIT}$ is a picture predictively coded from a picture P5'. A picture P11 is a picture predictively coded from the picture P8. A picture P14 is a picture predictively coded from the picture P11. A picture B7 is a picture predictively coded from a picture B6' and the picture B8. A picture B9 and a picture B10 are pictures predictively coded from the picture P8 and the picture P11. A picture B12 and a picture B13 are pictures predictively coded from the picture P11 and the picture P14.

In short, all the pictures from the picture B7 to the picture P14 in the edited coded stream $ST_{EDIT}$ are affected by the picture P5' generated from the insertion video data $V_{INS}$. Therefore, the pictures from the picture B7 to the picture P14 in the edited coded stream $ST_{EDIT}$ are different from the pictures from the picture B7 to the picture P14 in the original coded stream $ST_{ORG}$.

Thus, the system controller 13 controls the recording circuit 23 to end overwrite recording at the end (picture P14) of the edited coded stream $ST_{EDIT}$ on the basis of the recording timing control signal $RT_V$.

In the above-described embodiment, coding processing is carried out for each 15 pictures as one GOP. However, this invention is not limited to this embodiment, and editing processing on the frame basis can be carried out, no matter what number of pictures are included in one GOP. Also, in the above-described embodiment, video signals are compression-coded by the technique in conformity to the MPEG standard. However, this invention is not limited to this embodiment and may be broadly applied to the case where data compression coding is carried out by utilizing correlation between frames.

As described above, according to the present invention, by generating coded data to be reproduced, decoded and recorded with respect to the frame immediately before IN-point and the frame immediately after OUT-point, and if necessary, rerecording the coded data onto the recording medium, insertion editing processing on the frame basis can be carried out even in the case where image signals are recorded by inter-frame coding processing.

As described above, according to the data recording device and the data editing device of the present invention, an original coded stream reproduced from the magnetic tape is decoded to restore video data of the base band, and the original video data and insertion video data are connected to each other in the state of base band video. Thus, insertion editing on the frame basis can be carried out.

Also, instead of recording all the edited coded streams generated by coding edited video data edited at the base band level onto the magnetic tape, pictures corresponding to insertion video data and pictures near edit points such as IN-point and OUT-point, from among the edited coded stream, are recorded by overwriting at positions corresponding to the pictures of the original coded stream recorded on the recording medium. In short, only the pictures of the edited coded stream having coding results changed by insertion editing processing are recorded by overwriting onto the magnetic tape. Therefore, deterioration in picture quality of the coded stream which is insertion-edited and rerecorded on the magnetic tape can be minimized.

In addition, according to the data recording device and the data editing device of the present invention, if OUT-point is set in a GOP, the coded stream of the GOP including OUT-point is rewritten onto the magnetic tape. Therefore, deterioration in picture quality near OUT-point can be prevented.

Also, according to the data recording device and the data editing device of the present invention, if a picture of the edited coded stream is affected by insertion editing processing and is different from a picture of the original coded stream recorded on the magnetic tape, the picture of the edited coded stream is recorded onto the magnetic tape by overwriting. If the picture of the edited coded stream is not affected by insertion editing processing and is the same as the picture of the original coded stream recorded on the magnetic tape, the picture of the edited coded stream is not recorded onto the magnetic tape. Therefore, even when insertion editing processing is carried out, deterioration in picture quality of the coded stream which is insertion-edited and rerecorded on the magnetic tape can be prevented.

Also, according to the data recording device and the data editing device of the present invention, if the picture immediately before IN-point is I-picture, overwrite recording is started so that pictures from the picture immediately after IN-point are recorded onto the magnetic tape by overwriting. If the picture immediately before IN-point is B-picture, overwrite recording is started so that pictures at least from B-picture as the picture immediately before IN-point are recorded onto the magnetic tape. Therefore, the picture quality of the coded stream which is insertion-edited and recorded on the magnetic tape is not deteriorated.

The invention claimed is:

1. A data recording device for recording a coded stream onto a recording medium, the device comprising:
reproducing means for reproducing an original coded stream recorded on the recording medium;
decoding means for decoding the original coded stream outputted from the reproducing means and generating decoded video data of a base band;
editing means for switching the decoded video data of the base band and insertion video data at a set edit point and generating edited video data;
coding means for coding the edited video data to generate an edited coded stream;
recording means for recording the edited coded stream onto the recording medium; and
control means for controlling the recording means to record a picture of the edited coded stream onto the recording medium by overwriting in the case where the picture of the edited coded stream is affected by editing processing by the editing means and is different from a picture of the original coded stream recorded on the recording medium, and not to record the picture of the edited coded stream onto the recording medium in the case where the picture of the edited coded stream is not affected by editing processing by the editing means and is the same as the picture of the original coded stream recorded on the recording medium.

2. The data recording device as claimed in claim 1, wherein the control means generates a recording timing control signal for controlling recording operation for recording the edited coded stream onto the recording medium, the recording means controlling recording operation for recording the coded stream onto the recording medium on the basis of the recording timing control signal.

3. The data recording device as claimed in claim 1, wherein the recording means has means for recording audio data and system data corresponding to the coded stream to be recorded onto the recording medium into a predetermined area on the recording medium together with the coded stream, the control means generating a recording timing control signal for controlling overwrite recording of the edited coded stream onto the recording medium, a recording timing control signal for controlling recording of the system data onto the recording medium, and a recording timing control signal for controlling recording of the audio data onto the recording medium, the recording means controlling recording operation for recording the edited coded stream onto the recording medium on the basis of the recording timing control signal with respect to the edited coded stream, the recording means controlling recording operation for recording the system data onto the recording medium on the basis of the recording timing control signal with respect to the system data, the recording means controlling recording operation for recording the audio data onto the recording medium on the basis of the recording timing control signal with respect to the audio data.

4. The data recording device as claimed in claim 1, wherein the recording medium is constituted by a magnetic tape, the recording means having a recording head for recording the coded stream onto the magnetic tape, the reproducing means having a reproducing head for reproducing the original coded stream recorded on the magnetic tape, the reproducing head being provided at a position advanced from the recording head by an amount corresponding to a system delay based on decoding processing of the decoding means and coding processing of the coding means.

5. The data recording device as claimed in claim 1, wherein the recording medium is constituted by a magnetic tape, the recording means having a recording head for recording the coded stream onto the magnetic tape, the reproducing means having a reproducing head for reproducing the original coded stream recorded on the magnetic tape, the reproducing head being provided at a position advanced from the recording head so that when original data reproduced from the magnetic tape by the reproducing head of the reproducing means is supplied to the recording means through the decoding means and the coding means and is newly recorded by overwriting onto the recording medium by the recording head of the recording means, the position where the reproduced original data is recorded on the magnetic tape and the position of the data newly recorded by overwriting on the magnetic tape by the recording head are coincident with each other.

6. The data recording device as claimed in claim 1, wherein the recording medium is constituted by a magnetic tape, the recording means having a recording head for recording the coded stream onto the magnetic tape, the reproducing means having a reproducing head for reproducing the original coded stream recorded on the magnetic tape, the recording head and the reproducing head being arranged so that the reproducing head scans the magnetic tape earlier than the recording head by an amount of a delay time obtained by adding a delay time of a reproduction processing system including decoding processing of the decoding means and a delay time of a recording processing system including coding processing of the coding means.

7. The data recording device as claimed in claim 4, wherein the reproducing head is constituted by a plurality of magnetic heads, the reproducing means generating a reproduced coded stream by synthesizing reproduced signals from the plurality of magnetic heads even when the plurality of magnetic heads are in off-track states with respect to tracks on the magnetic tape.

8. The data recording device as claimed in claim 1, wherein the control means controls the recording means to record pictures from a picture immediately after IN-point onto the recording medium by overwriting if a picture immediately before IN-point is I-picture, and controls the recording means to record picture at least from B-picture as a picture immediately before IN-point onto the recording medium by overwriting if the picture immediately before IN-point is B-picture.

9. The data recording device as claimed in claim 1, wherein the control means controls the recording means so that if OUT-point is set in a GOP, at least pictures up to the last picture of the GOP having OUT-point set therein are recorded by overwriting onto the recording medium.

10. A data recording device for recording a coded stream onto a recording medium, the device comprising:

reproducing means for reproducing an original coded stream recorded on the recording medium;

decoding means for decoding the original coded stream outputted from the reproducing means and generating decoded video data of a base band;

editing means for switching the decoded video data of the base band and insertion video data at a set edit point and generating edited video data, coding means for coding the edited video data to generate an edited coded stream;

recording means for recording the edited coded stream onto the recording medium; and control means for controlling the recording means to record pictures from a picture immediately after IN-point onto the recording medium by overwriting in the case where a picture immediately before the IN-point is I-picture, and controlling the recording means to record pictures at least from B-picture as a picture immediately before the IN-point onto the recording medium by overwriting in the case where the picture immediately before the IN-point is B-picture.

11. The data recording device as claimed in claim 10, wherein the control means controls the recording means so that if OUT-point is set in a GOP, at least pictures up to the last picture of the GOP having OUT-point set therein are recorded by overwriting onto the recording medium.

* * * * *

UNITED STATES PATENT AND TRADEMARK OFFICE
CERTIFICATE OF CORRECTION

PATENT NO.         : 7,421,189 B2  
APPLICATION NO. : 10/901685  
DATED                  : September 2, 2008  
INVENTOR(S)        : Ichiro Aki et al.

Page 1 of 1

It is certified that error appears in the above-identified patent and that said Letters Patent is hereby corrected as shown below:

Title page Add

Item
--(30)    Foreign Application Priority Data

October 28, 1997    JP    9-295991.--

Signed and Sealed this

Fourth Day of November, 2008

JON W. DUDAS  
*Director of the United States Patent and Trademark Office*